US012756413B2

(12) United States Patent
Puthenpurakel et al.

(10) Patent No.: US 12,756,413 B2
(45) Date of Patent: Oct. 6, 2026

(54) METHODS AND APPARATUSES FOR DETERMINING WHETHER AN ANOMALOUS EVENT OCCURRED LOCALLY AT A FIRST ENTITY

(71) Applicant: Telefonaktiebolaget LM Ericsson (publ), Stockholm (SE)

(72) Inventors: Sleeba Paul Puthenpurakel, Kerala (IN); Ranjani H G, Bangalore (IN); Art Brisebois, Westport Point, MA (US); Venkatesh Umaashankar, Chennai (IN); Serene Banerjee, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 18/292,039

(22) PCT Filed: Aug. 3, 2021

(86) PCT No.: PCT/SE2021/050768

§ 371 (c)(1),
(2) Date: Jan. 25, 2024

(87) PCT Pub. No.: WO2023/014249

PCT Pub. Date: Feb. 9, 2023

(65) Prior Publication Data

US 2024/0364375 A1 Oct. 31, 2024

(51) Int. Cl.
*H04B 1/12* (2006.01)
*H04B 1/10* (2006.01)
*H04B 1/525* (2015.01)

(52) U.S. Cl.
CPC .......... *H04B 1/123* (2013.01); *H04B 1/1027* (2013.01); *H04B 1/525* (2013.01)

(58) Field of Classification Search
CPC ........ H04B 1/10; H04B 1/1027; H04B 1/123; H04B 1/525; H04B 17/309; H04B 17/345;
(Continued)

(56) References Cited

U.S. PATENT DOCUMENTS 9,532,252 B2 * 12/2016 Hariharan ............. H04W 24/10
10,039,021 B2 * 7/2018 Wilson .................. H04W 24/08
(Continued)

FOREIGN PATENT DOCUMENTS

WO 2020101549 A1 5/2020
WO 2021224675 A1 11/2021
WO 2022124954 A1 6/2022

OTHER PUBLICATIONS

Extended European Search Report dated Aug. 28, 2024, for European Patent Application No. 21952960.9, 11 pages.
(Continued)

*Primary Examiner* — Quochien B Vuong
(74) *Attorney, Agent, or Firm* — Sage Patent Group

(57) ABSTRACT

A method receives data from entities indicative of whether or not an anomalous event is occurring at the entities over a first time period. The method characterizes the system, based on the data and a system characterization model, as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities. The method uses one or more anomaly detection models to compare the data received from the first entity to
(Continued)

the data received from other entities in the plurality of entities, and determine that a local anomalous event has occurred at an entity.

20 Claims, 30 Drawing Sheets

(58) Field of Classification Search
CPC ...... H04W 24/00; H04W 24/04; H04L 41/14; H04L 41/142; H04L 41/145
See application file for complete search history.

(56) References Cited

U.S. PATENT DOCUMENTS

| | | | | |
|---|---|---|---|---|
| 2018/0070362 | A1 | 3/2018 | Ryan et al. | |
| 2019/0081969 | A1 | 3/2019 | Phadke et al. | |
| 2019/0320444 | A1 | 10/2019 | Hakanson et al. | |
| 2019/0386759 | A1 | 12/2019 | Singh et al. | |
| 2020/0228210 | A1 | 7/2020 | Lapierre et al. | |
| 2021/0160746 | A1* | 5/2021 | Diggins | H04B 1/525 |
| 2022/0014533 | A1* | 1/2022 | Almaz | H04L 43/16 |

OTHER PUBLICATIONS

Dridi, Aicha et al., "STAD: Spatio-Temporal Anomaly Detection Mechanism for Mobile Network Management," IEEE Transactions on Network and Service Management, vol. 18, No. 1, Mar. 2021, 13 pages.
International Search Report and Written Opinion of the International Searching Authority, PCT/SE2021/050768, mailed Apr. 26, 2022, 14 pages.
Hallac, David et al., "Toeplitz Inverse Covariance-Based Clustering of Multivariate Time Series Data," Proc. of the 23rd ACM SIGKDD International Conference on Knowledge Discovery and Data Mining, 2017, 9 pages.
Cui, Zhiyong et al., "Traffic Graph Convolutional Recurrent Neural Network: A Deep Learning Framework for Network-Scale Traffic Learning and Forecasting," IEEE Trans. On Intelligent Transportation System, 2019, 13 pages.
Müller, Meinard, "Dynamic Time Warping," Chapter 4 in: Information Retrieval for Music and Motion, Springer, 2007, 16 pages.
Strang, Gilbert, "Wavelet Transforms Versus Fourier Transforms," Bulletin of the American Mathematical Society, vol. 28, No. 2, Apr. 2, 1993, 18 pages.
Sammut, C. et al., eds, "Hidden Markov Models," In: Encyclopedia of Machine Learning and Data Mining, Springer Science and Business Media, New York, USA, 2017, 24 pages.
Rabiner, Lawrence R., "A Tutorial on Hidden Markov Models and Selected Applications in Speech Recognition", Proceedings of the IEEE, vol. 77, No. 2, 1989, 30 pages.
Chen, Ran, "Passive Inter-modulation Cancellation in FDD System," Master's thesis, Lund University and Ericsson AB, 2017, 55 pages.

* cited by examiner

METHODS AND APPARATUSES FOR DETERMINING WHETHER AN ANOMALOUS EVENT OCCURRED LOCALLY AT A FIRST ENTITY

CROSS REFERENCE TO RELATED APPLICATIONS

This application is a 35 U.S.C. § 371 national stage application of PCT International Application No. PCT/SE2021/050768 filed on Aug. 3, 2021, the disclosure and content of which is incorporated by reference herein in its entirety.

TECHNICAL FIELD

Embodiments described herein relate to methods and apparatuses for determining whether an anomalous fault event occurring at first entity within a system has occurred locally at the first entity, wherein the system comprises a plurality of entities comprising the first entity. In some examples, the method may be specifically used to determine whether dynamic interference occurring at a cell in a network is due to a passive intermodulation (PIM) noise event.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Uplink reception quality may be dependent upon the signal-to-interference-plus-noise ratio (SINR) or the signal-to-noise ratio (SNR), which is also dependent upon uplink noise. Uplink noise may vary by time and by cell. Time-variant and bursty uplink noise sources typically vary with network load. These noise sources may comprise UEs served by neighboring cells and PIM (passive intermodulation) noise, which is a product of downlink transmitters. These noise sources may then mix to yield uplink interference.

The dynamic interference sources many be addressed by dynamic link adaptation mechanisms which configure scheduling grants, MCS (modulation coding schemes) and other radio parameters per transmission time interval (TTI), every millisecond. These dynamic interference sources may also comprise active components in the radio path comprising: external interferers, distributed antenna systems and repeaters or coverage enhancers.

It may be desirable to be able to identify time intervals during which a cell is experiencing bursty uplink noise sources. In particular it may be desirable to be able to identify when a cell is experiencing a PIM noise event. Current solutions focus on automatic identification of time intervals with static interference.

PIM is a major concern for operators, as its effects are pronounced with:

a) Increasing number of radio frequency bands and carriers, especially with the introduction of 5G,
b) Increasing aggregate downlink power near sensitive uplink receivers
c) Age and corrosion of metal components
d) Environmental changes including temperature and humidity
e) Larger number of passive metal components nearby, including antennas, radio heads and bracketry which can all corrode over time Existing solutions for PIM detection and mitigation comprise: (a) the use of additional Digital Signal Processor (DSP) hardware at the baseband that can detect and cancel problem frequency combinations during a maintenance window, (b) the use of advanced antennas that refocus the beam to minimize interference, and (c) root cause analysis modules that predict PIM noise events based on aggregated Key Performance Indicators (KPIs). However, the a) and b) solutions require additional hardware or replacement and are therefore expensive. The c) solution is relatively ineffective since PIM is a transient artifact that can cycle between good and bad many times within aggregate KPI reporting intervals.

Simulated environments often fail to capture many real-life network and environmental variables. For these reasons, data-driven Artificial Intelligence or Machine Learning approaches, using real-network data, will often outperform simulations. Furthermore, aggregating data over dissimilar cells or over time may lead to approximations that may not be representative. These variables are especially confounding for transient PIM since noise, time, amplitude and frequency may all be influenced by location-specific variables. Hardware-based solutions, including the DSP approach mentioned above, are comprehensive but costly from an equipment and management perspective.

SUMMARY

According to some embodiments there is provided a method for determining whether an anomalous event occurring at first entity within a system has occurred locally at the first entity, wherein the system comprises a plurality of entities comprising the first entity. The method comprises receiving data from the plurality of entities indicative of whether or not an anomalous event is occurring at each of the plurality of entities over a first time period; characterizing the system, based on the received data and a system characterization model, as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities; and utilizing one or more of a plurality of anomaly detection models to compare the data received from the first entity to the data received from other entities in the plurality of entities; and responsive to an output of any of the one or more of the plurality of anomaly detection models indicating that the anomalous event has occurred locally at the first entity: determining that a local anomalous event has occurred at the first entity; and assigning a confidence level to the determination that the local anomalous event has occurred at the first entity, wherein the confidence level is based on the characterization of the system.

According to some embodiments there is provided a method for detecting a passive intermodulation, PIM, noise event in a first cell in a network. The method comprises obtaining an indication of uplink noise in the first cell over a first time period; obtaining an indication of uplink noise in one or more neighboring cells to the first cell over the first time period; comparing the uplink noise in the first cell to the uplink noise in the one or more neighboring cells; and responsive to the comparison indicating that: the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, determining that a PIM noise event has occurred at the first cell during the second time period.

According to some embodiments there is provided an apparatus for determining whether an anomalous event occurring at first entity within a system has occurred locally at the first entity, wherein the system comprises a plurality of entities comprising the first entity. The apparatus comprises processing circuitry configured to: receive data from the plurality of entities indicative of whether or not an anomalous event is occurring at each of the plurality of entities over a first time period; characterize the system, based on the received data and a system characterization model, as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities; utilize one or more of a plurality of anomaly detection models to compare the data received from the first entity to the data received from other entities in the plurality of entities; and responsive to an output of any of the one or more of the plurality of anomaly detection models indicating that the anomalous event has occurred locally at the first entity: determine that a local anomalous event has occurred at the first entity; and assign a confidence level to the determination that the local anomalous event has occurred at the first entity, wherein the confidence level is based on the characterization of the system.

According to some embodiments there is provided an apparatus for detecting a passive intermodulation, PIM, noise event in a first cell in a network. The apparatus comprises processing circuitry configured to cause the apparatus to: obtain an indication of uplink noise in the first cell over a first time period; obtain an indication of uplink noise in one or more neighboring cells to the first cell over the first time period; compare the uplink noise in the first cell to the uplink noise in the one or more neighboring cells; and responsive to the comparison indicating that: the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, determine that a PIM noise event has occurred at the first cell during the second time period.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
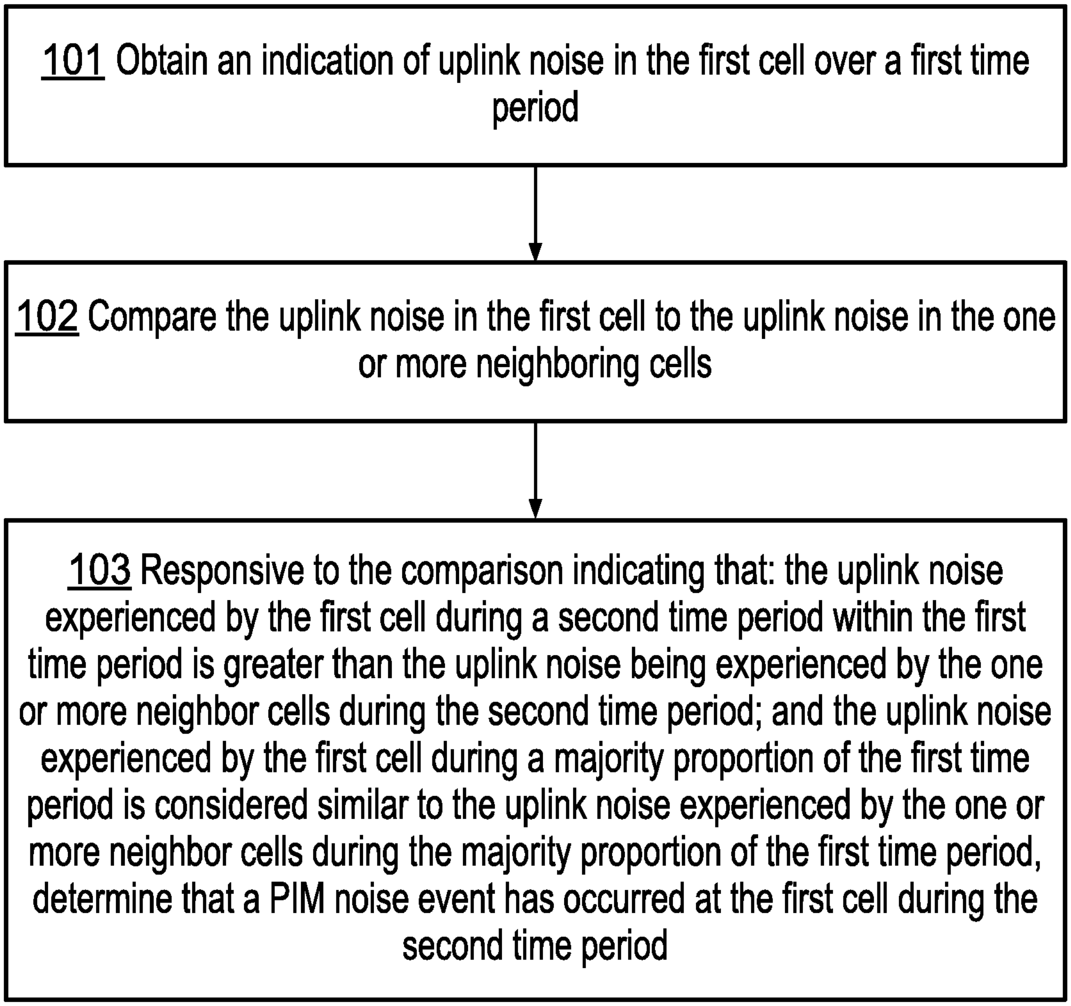
FIG. 1 illustrates a method for detecting a passive intermodulation, PIM, noise event in a first cell in a network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide a method and apparatus for detecting a passive intermodulation, PIM, noise event in a first cell in a network. For example, embodiments described herein may automatically identify PIM effects from the changes is uplink noise in the first cell and one or more neighbor cells. In RAN, KPIs have causal inter-relationships. For example, SINR degradation can occur due to a rise in interference in the local cell, and/or from a UE served by a neighbor cell. Some embodiments further allow for the detection of the PIM noise events in the presence of other noise and even missing data.

However, the problem statement of detecting whether an anomalous event (for example a fault event such as a PIM noise event) has occurred locally at an entity is not necessarily limited to RAN, but can also be applied to many other domains for example, a Core network and a Basic Service Set (BSS).

The determination of whether an anomalous event has occurred locally at an entity may, for example, be especially useful for virtualized environments where multiple virtual network functions share common compute resources. For example, consider a computer platform running 5 different virtual network functions before a crash or other severe degradation event. In this case, it may be important to automatically detect and classify the time series usage of the virtual network functions that may or may not have contributed to the crash. In this example, therefore the entities comprise the virtual network functions, the anomalous event is the crash, and the aim is to determine whether the anomalous even has occurred locally at one of the virtual network functions, or if the error was experienced globally by all (or most) of the virtual network functions.

Some embodiments described herein therefore provide a method and apparatus for determining whether an anomalous event occurring at a first entity within a system has occurred locally at the first entity. It will be appreciated that embodiments described herein may also be applicable to alarm correlation use cases, to detect the causal patterns leading to alarms.

Bursty uplink noise in cells may result from:

(a) heavy cellular traffic load and UE-generated interference (b) a passive interference modulation (PIM) noise event, or (c) non-cellular interference As described above, embodiments described herein identify cells that are experiencing passive intermodulation (PIM) noise by analyzing the interference pattern of the cell and one or more its neighbors cells. Static interference may be inferred when the binned values of interference (i.e. pmRadioRecInterferencePwrPucch) is restricted to one energy band, and the noise is consistent for a few days.

Cells with time-varying noise/interference characteristics, and cells with stable noise/interference characteristics may be classified and assigned into separate groups using a machine learning model. Following this initial classification, embodiments described herein may further differentiate and classify the noise originating from traffic and the noise originating from PIM.

If the noise is from traffic, the neighboring cells would also be experiencing a similar rise in uplink noise. But, for PIM, the noise rise would be local to that particular cell only, with minimal environmental impact.

FIG. 1 illustrates a method 100 for detecting a passive intermodulation, PIM, noise event in a first cell in a network. The method of FIG. 1 may be performed by an apparatus (for example a network node), which may comprise a physical or virtual node, and may be implemented in a computing device or server apparatus and/or in a virtualized environment, for example in a cloud, edge cloud or fog deployment.

In step 101 the method comprises obtaining an indication of uplink noise in the first cell over a first time period.

In step 102 the method comprises obtaining an indication of uplink noise in one or more neighboring cells to the first cell over the first time period.

The indications of uplink noise obtained in steps 102 and 103 may be obtained based on Key Parameter Indicator (KPI) data which may be collected in 15-minute aggregated intervals. It will be appreciated that in some examples, KPI data may be aggregated at finer or courser time intervals as well.

In step 103, the method comprises comparing the uplink noise in the first cell to the uplink noise in the one or more neighboring cells.

In step 104, responsive to the comparison indicating that: the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, the method comprises determining that a PIM noise event has occurred at the first cell during the second time period.

In some examples, step 104 may be performed further responsive to the comparison indicating that any reductions in a signal to noise ratio (e.g. SNR or SINR) experienced by the first cell during the first time period do not correspond in time with any rises in uplink noise levels at the one or more neighbor cells.

It will be appreciated that the uplink noise experienced by the first cell during a time period may be considered similar to the uplink noise experienced by another cell during the time period if there is a statistical similarity between the uplink noise. It will be appreciated that there may be many ways of evaluating the statistical similarity between two time series signals, and it will be further appreciated, that the degree of similarity between the two signals required for the signals to be "considered similar" may be a design choice.

In some examples, the method of FIG. 1 further comprises selecting the one or more neighbor cells based on a number of handover counts experienced by each of the one or more neighbor cells being similar to a number of handover counts experienced by the first cell. In some examples, the one or more neighbor cells are selected by X2 neighbor relations (which are database entries indicating a neighbor status of a cell which may be recorded every 15 mins as pmCounters). These are both means to identify cells which have relatively low inter-site path loss that is indicative of a common radio environment with overlapping coverage. It will be appreciated that cells with common coverage areas, indicated by things like handover counts, will exhibit common interference trends unless the source of interference is local to a single cell site.

FIG. 2 illustrates the average interference of the first cell (squares), the average SINR of the first cell (circles), and the average interference of a first neighbor cell (triangles).

Figure 2A:
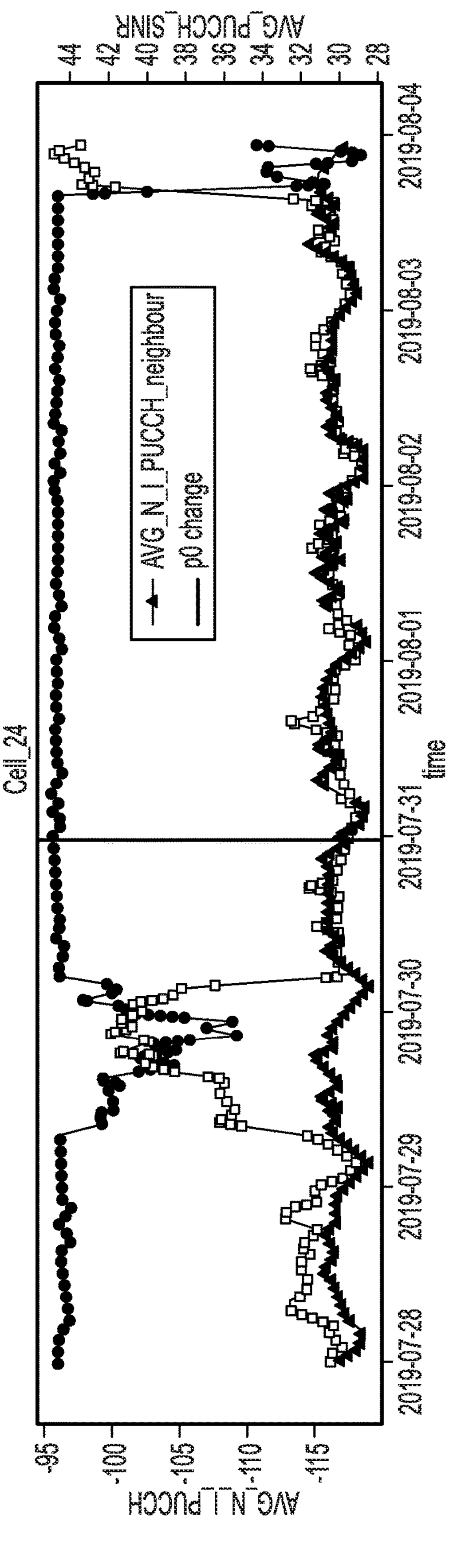
FIG. 2 illustrates the average interference of the first cell (squares), the average SINR of the first cell (circles), and the average interference of a first neighbor cell (triangles)

In FIG. 2*a*, it can be seen that for most of the days the rise in uplink noise of the first cell follows a pattern very similar to that of the neighbor cell. However, on the second day, the rise in noise in the first cell exceeds that of the neighbors and there is little or no environmental impact.

Figure 2B:
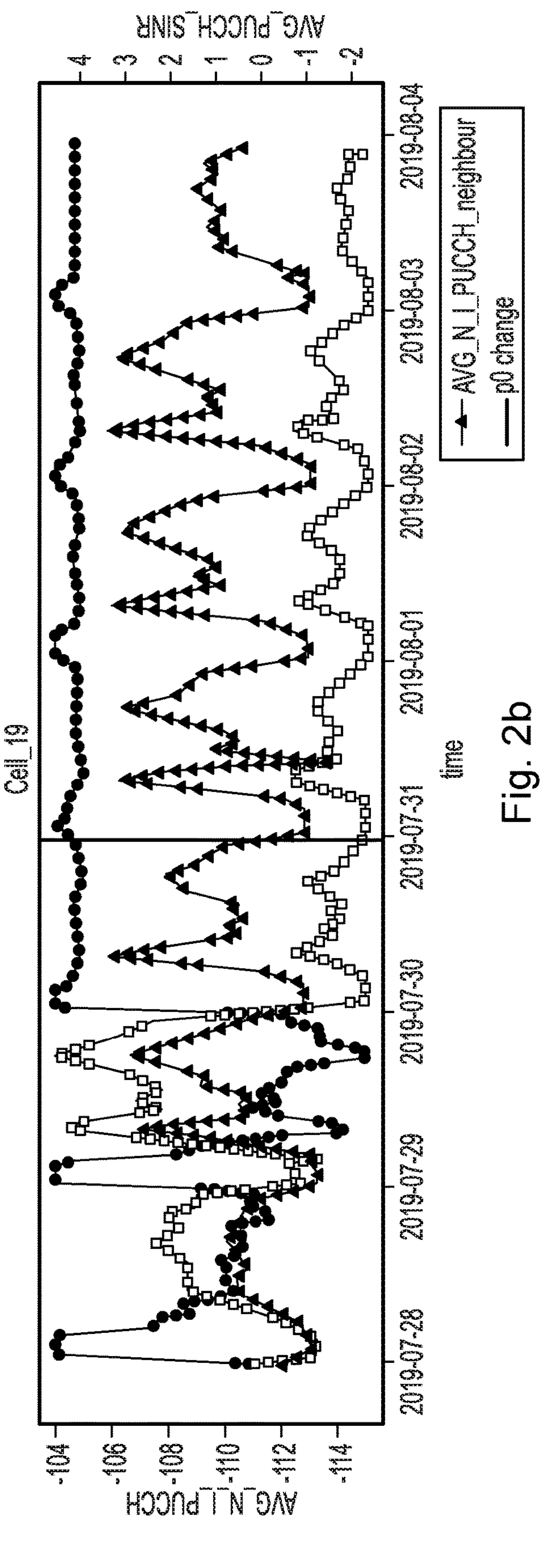

So, the method of FIG. 1 may characterize, that the noise is from PIM. FIG. 2*b* illustrates the results after the cause of the PIM event is corrected. It can be seen that there is a significant rise in SINR after the second day.

Step 103 of FIG. 1 may comprise analyzing interference KPIs (specifically, pmRadioRecInterferencePwrPucch and pmRadioRecInterferencePwrPucsh, i.e. the received interference at the control and the shared channels), of the first cell and the at least one neighbor cell, as multivariate time series, to determine when a cell is experiencing PIM problems.

For example, step 103 of FIG. 1 may comprise utilizing one or more of a plurality of anomaly detection models to compare the data received from the first cell to the data received from the one or more neighbor cells. In some examples, step 103 may be performed as described with reference to FIG. 6 and FIG. 13 below.

The plurality of anomaly detection models may comprise one or more of:

1) a time series distance-based model, such as, Dynamic time warping (DTW);
2) a frequency based model, such as, a wavelet-based approaches or a Short-Time Fourier Transform (STFT);
3) A sequence modelling based model, such as, a Hidden-Markov Model (HMM) or a Long Short Term Memory (LSTM) based model.

Examples of these types of anomaly detection models will be described later.

Some of these anomaly detection models may be better at determining whether the cell is experiencing more PIM than others, depending on the scenario.

Figure 3:
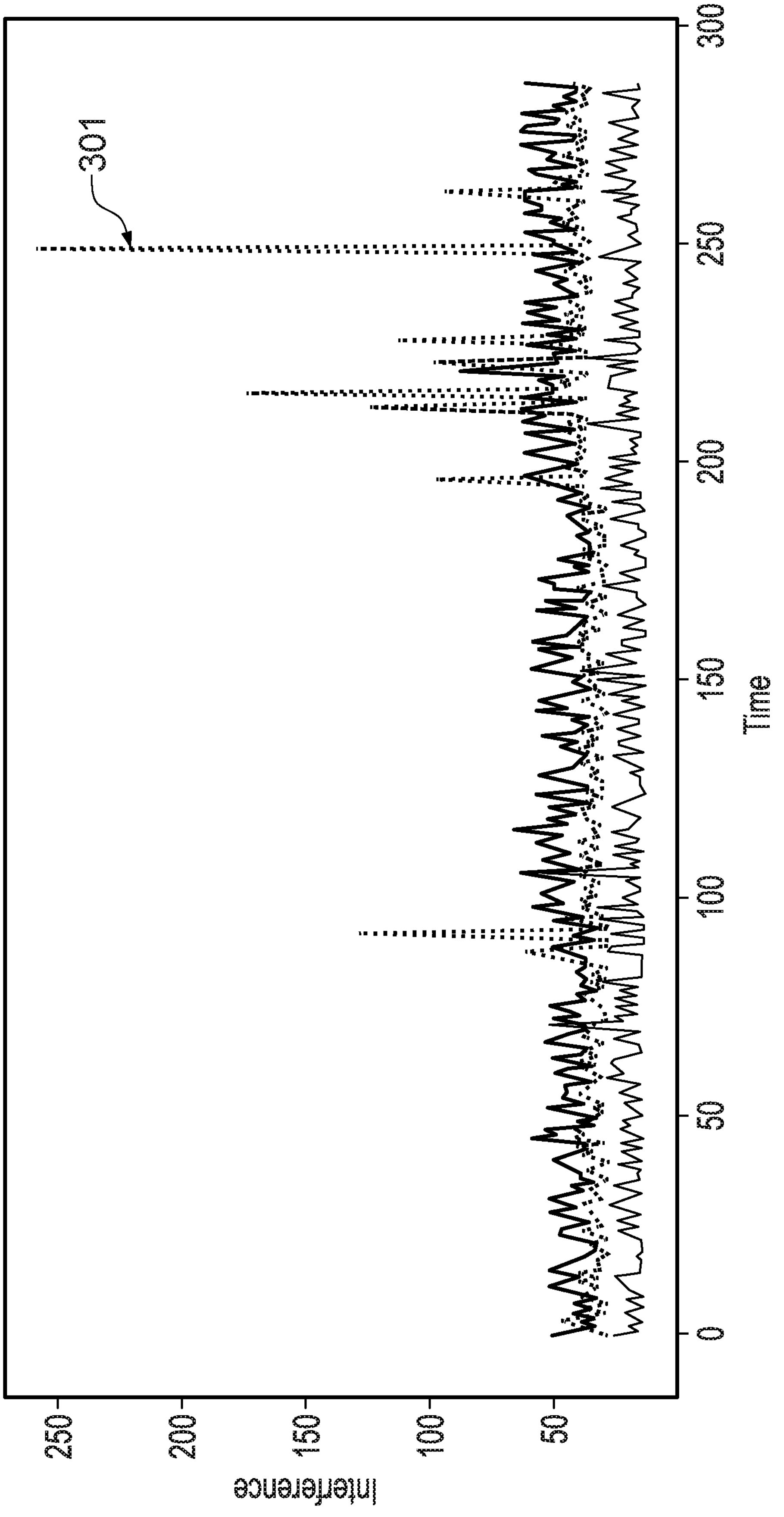
FIG. 3 illustrates the interference pattern of a first cell (dotted line) and two of its neighbor cells (the thick and thin solid lines)

For example, FIG. 3 illustrates the interference pattern of a first cell (dotted line) and two of its neighbor cells (the thick and thin solid lines). In this example, the clearly visible PIM artifact 301 may be correctly identified by all three types of anomaly detection model mentioned above.

Figure 4:
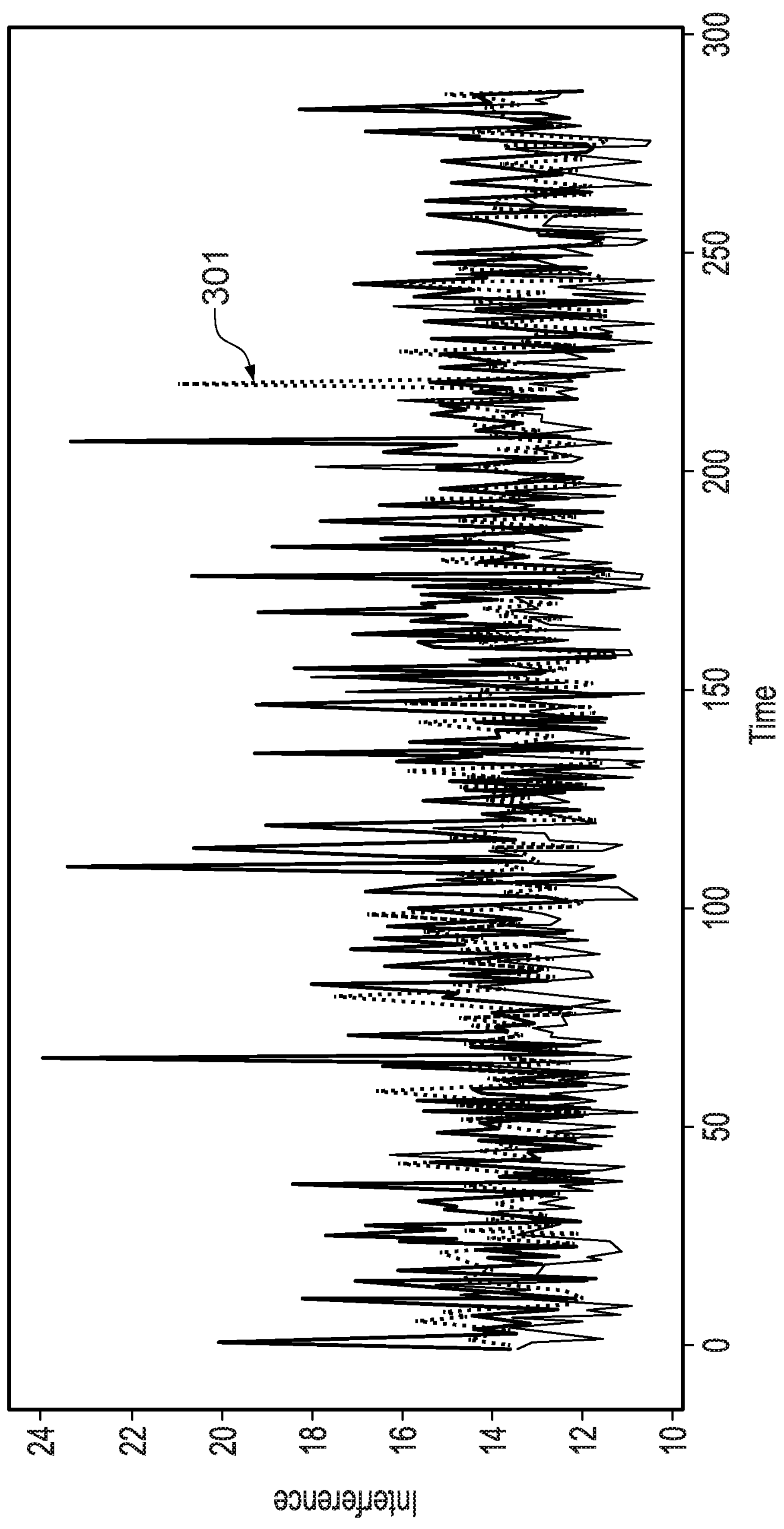
FIG. 4 illustrates the interference pattern of a first cell (dotted line) and two of its neighbor cells (the thick and thin solid lines)

However, for scenarios in which the noise is high as illustrated in FIG. 4, it is difficult to select one of the anomaly detection models to correctly locate the presence of the PIM noise event 301.

Figure 5:
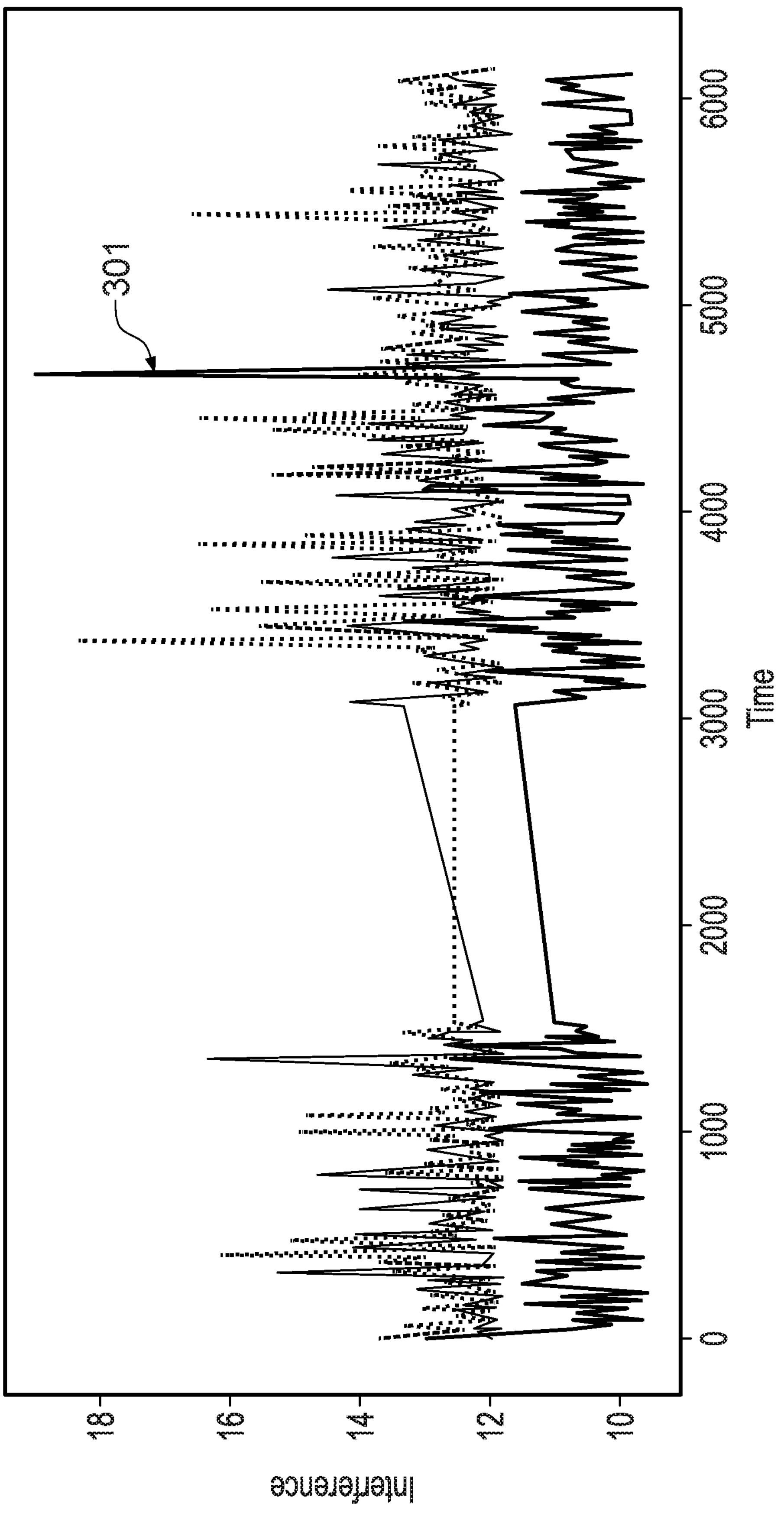
FIG. 5 illustrates the interference pattern of a first cell (dotted line) and two of its neighbor cells (the thick and thin solid lines)

Other practical challenges include missing data, as illustrated in FIG. 5.

For these (and other) challenges, the embodiments described herein may make use of an ensemble of the plurality of anomaly detection modes. This concept may be applied to scenarios other than PIM artifacts in a cell, as will now be described with reference to FIG. 6.

Figure 6:
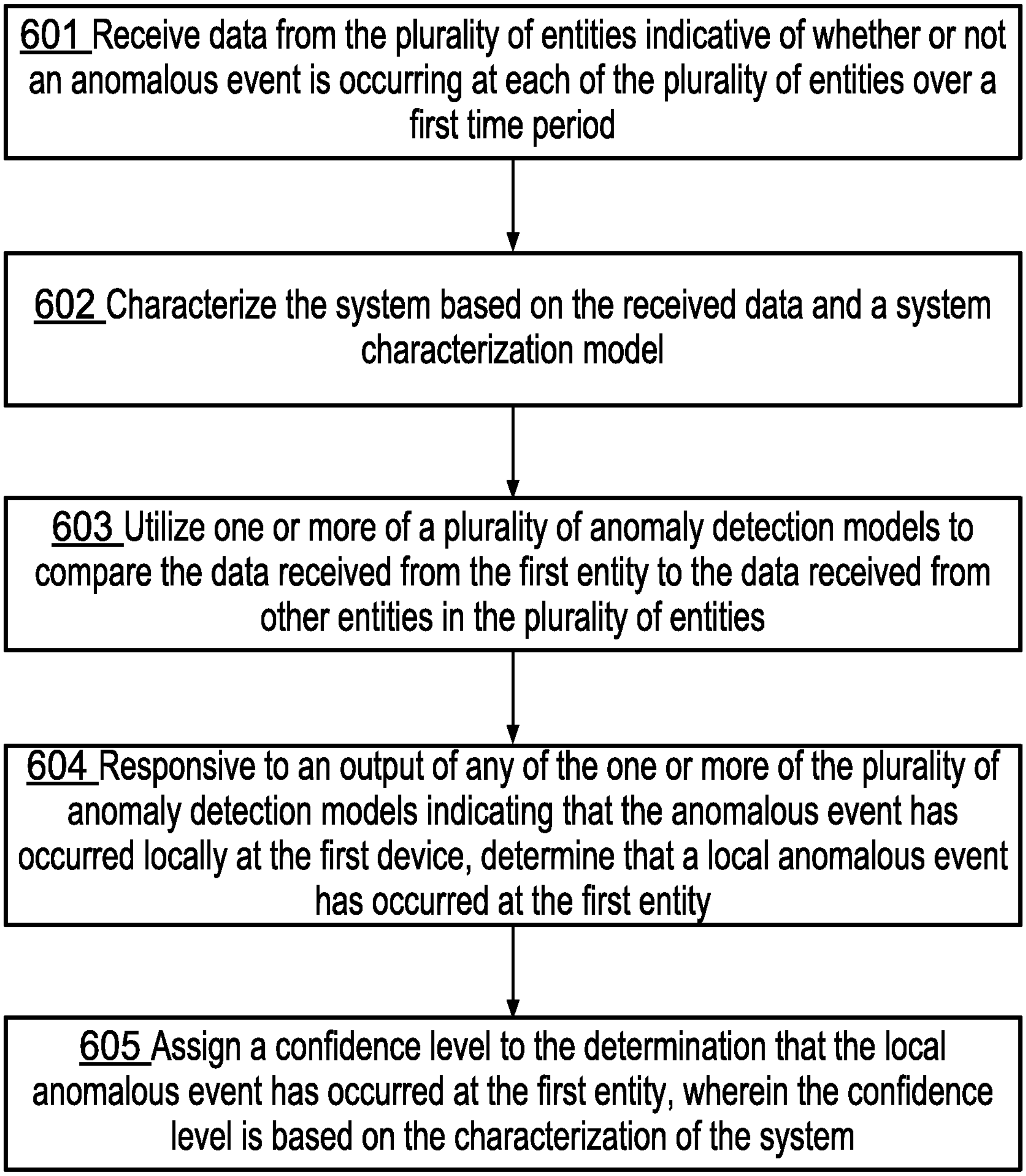
FIG. 6 illustrates a method for determining whether an anomalous event occurring at first entity within a system has occurred locally at the first entity, wherein the system comprises a plurality of entities comprising the first entity.

FIG. 6 illustrates a method for determining whether an anomalous event occurring at first entity within a system has occurred locally at the first entity, wherein the system comprises a plurality of entities comprising the first entity. It will be appreciated that the first entity may comprise a first cell, plurality of entities may comprise the first cell and one or more neighbor cells, and the anomalous event may comprise a PIM noise event.

In step 601 the method comprises receiving data from the plurality of entities indicative of whether or not an anomalous event is occurring at each of the plurality of entities over a first time period. For example, step 601 may comprise receiving the uplink interference signals (e.g as illustrated in FIGS. 2*a* and 2*b*) from the first cell and the one or more neighbor cells.

In step 602, the method comprises characterizing the system based on the received data and a system characterization model. Step 602 may comprises characterizing the system as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities. The system characterization model may comprise a machine learning model such as a neural network.

In step 603 the method comprises utilizing one or more of a plurality of anomaly detection models to compare the data received from the first entity to the data received from other entities in the plurality of entities. In some examples, only one of the plurality of anomaly detection models may be selected based on the output of system characterization models. However, in some examples, a plurality of anomaly detection models are used in parallel to compare the data received from the first entity to the data received from other entities in the plurality of entities.

In step 604, the method comprises, responsive to an output of any of the one or more of the plurality of anomaly detection models indicating that the anomalous event has occurred locally at the first device, determining that a local anomalous event has occurred at the first entity.

In step 605 the method comprises assigning a confidence level to the determination that the local anomalous event has occurred at the first entity, wherein the confidence level is based on the characterization of the system. For example, some anomaly detection models may be known to perform badly when the system is characterised in a certain way. For example, a time series distance based model may not perform well if the system is characterised as a system for which during at least one second time period within the first time period data is missing for one or more of the plurality of entities. Therefore, in this scenario, if a time series distance based model provides an output that indicates that an anomalous event has occurred locally at the first device, the method may assign a low confidence level to this output.

In contrast, if the a time series distance based model provides an output that indicates that an anomalous event has occurred locally at the first device when the system has been characterized as a system in which only the first entity is experiencing an anomalous event at any one time, the method may assign a higher confidence level to the output.

An example of how confidence levels can be assigned to different model types in different scenarios may be described in more detail with reference to FIG. 13.

In some examples, the confidence level is determined using a confidence level model. The confidence level model may comprise a machine learning model such as a neural network.

In some examples, one or both of the confidence level model and the system characterization model may be adjusted based on some feedback relating to whether the determination that a local anomalous event has occurred at the first entity was correct. For example, the feedback may be used to adjust the weights of confidence level model and the system characterization model.

An example implementation of the method of FIG. 6 will be described in more detail with reference to FIG. 13.

In some examples of the method of FIG. 6, the plurality of entities comprise cells in a radio communications network. The data received from the plurality of cells comprises interference related data. An anomalous event may therefore comprise a rise in uplink noise. In this example, if the anomalous event is found to be a local anomalous event is may be considered to correspond to a PIM noise event. The data collected from the plurality of cells may comprise KPIs collected at 15-minutes intervals. The proposed method is also agnostic to whether it is for the control channel (PUCCH) or the shared channel (PUSCH) data.

As previously mentioned, the method of FIG. 6 may be applied to other applications. For example, the plurality of entities may comprise users in a communications network. The data received from the users may comprise network logs of usage of applications by the various users. An anomalous event may in this example comprise an anomaly occurring in the use of the application. In this example, an overuse of a network by a particular user will be local to the user only. However, network faults that affect a large number of users, will be experienced by multiple users.

It will be appreciated that, in any Core Network setting where it would be useful to isolate a local versus a global problem, the method of FIG. 6 may be implemented.

In some examples, the plurality of entities comprise any plurality of entities providing time-series signals. The data received from the plurality of entities, comprises the time-series signals. In this example, an anomalous event may comprise any anomalous event in the time-series signals that could trigger an alarm in the system. In particular, the method of FIG. 6 may be utilised for alarm correlation to root cause detection for fault analysis. Usually for global faults, there may be a systemic rise of alarms (triggered by a plurality of the time-series signals) whereas for local faults the alarm could be localized in time (and localised to a single time-series signal). So, in such scenarios, to find intervals in time where the anomalous behavior is local or affects more than one time series, the method of FIG. 6 may be used.

In some examples, the plurality of entities may comprise sensors in a driverless vehicle. The data received sensors may comprise sensor data. In this example an anomalous event may comprise an anomalous reading occurring at a sensor. In such driverless vehicles there may be multiple sensors responsible for the vehicle. At any given time an unexpected reading in one of the sensors may be from local causes or from a global external cause such as a car crash. The method of FIG. 6 may therefore be used to isolate local causes from global causes. This may then be used to auto-trigger fast repair of any sensor before any more damage occurs, or may indicate an environmental cause (such as a crash), which cannot be repaired.

It will also be appreciated that in some examples an anomalous event may comprise fault event (e.g. a PIM noise event) or positive event (for example an increase in received power at a particular user in a network).

Figure 7:
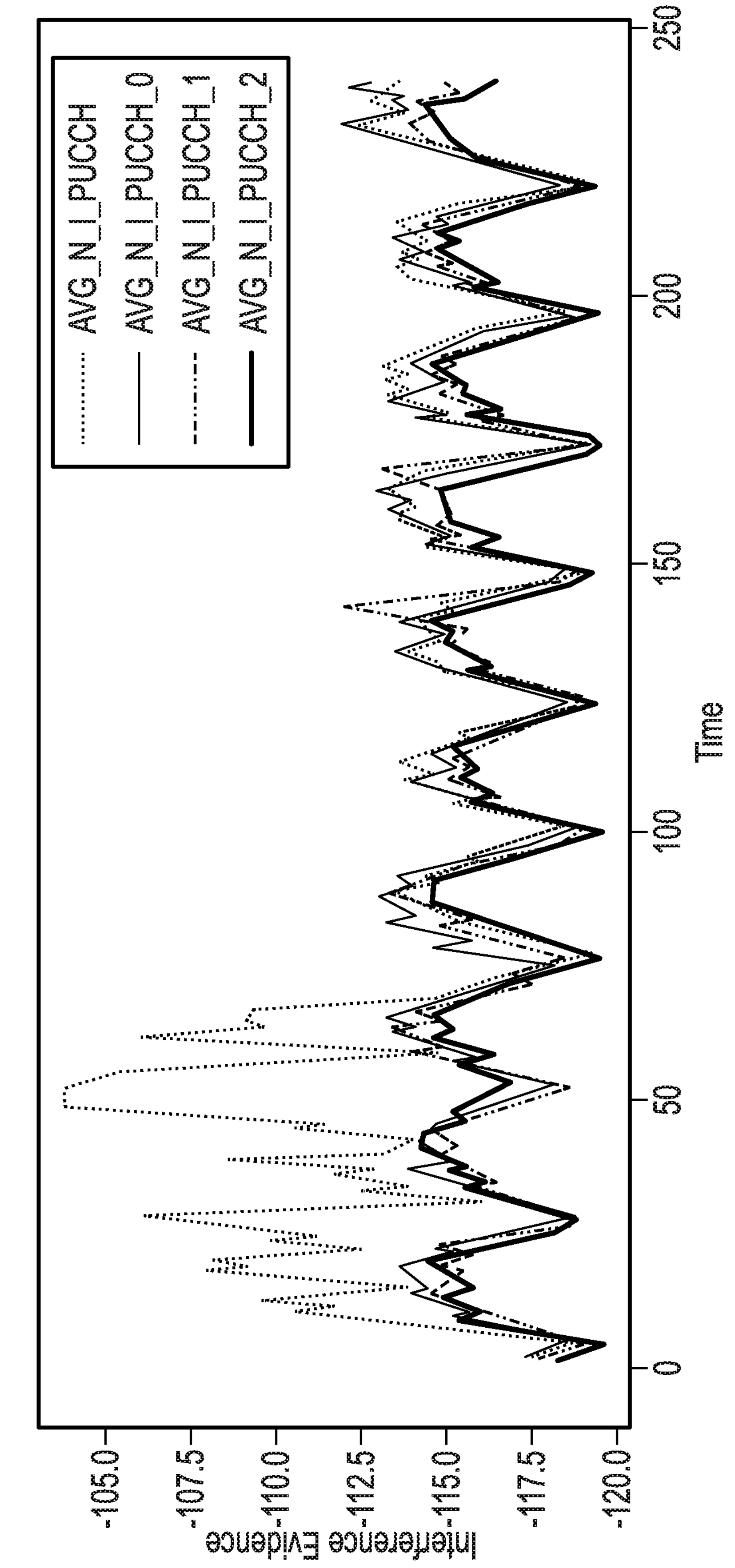
FIG. 7 is a graph illustrating how the signal of the first cell which is subjected to a PIM noise event is not correlated (during the time period associated with the PIM noise event) with the signals received the from rest of the cells which are unaffected by the PIM event.
Figure 8:
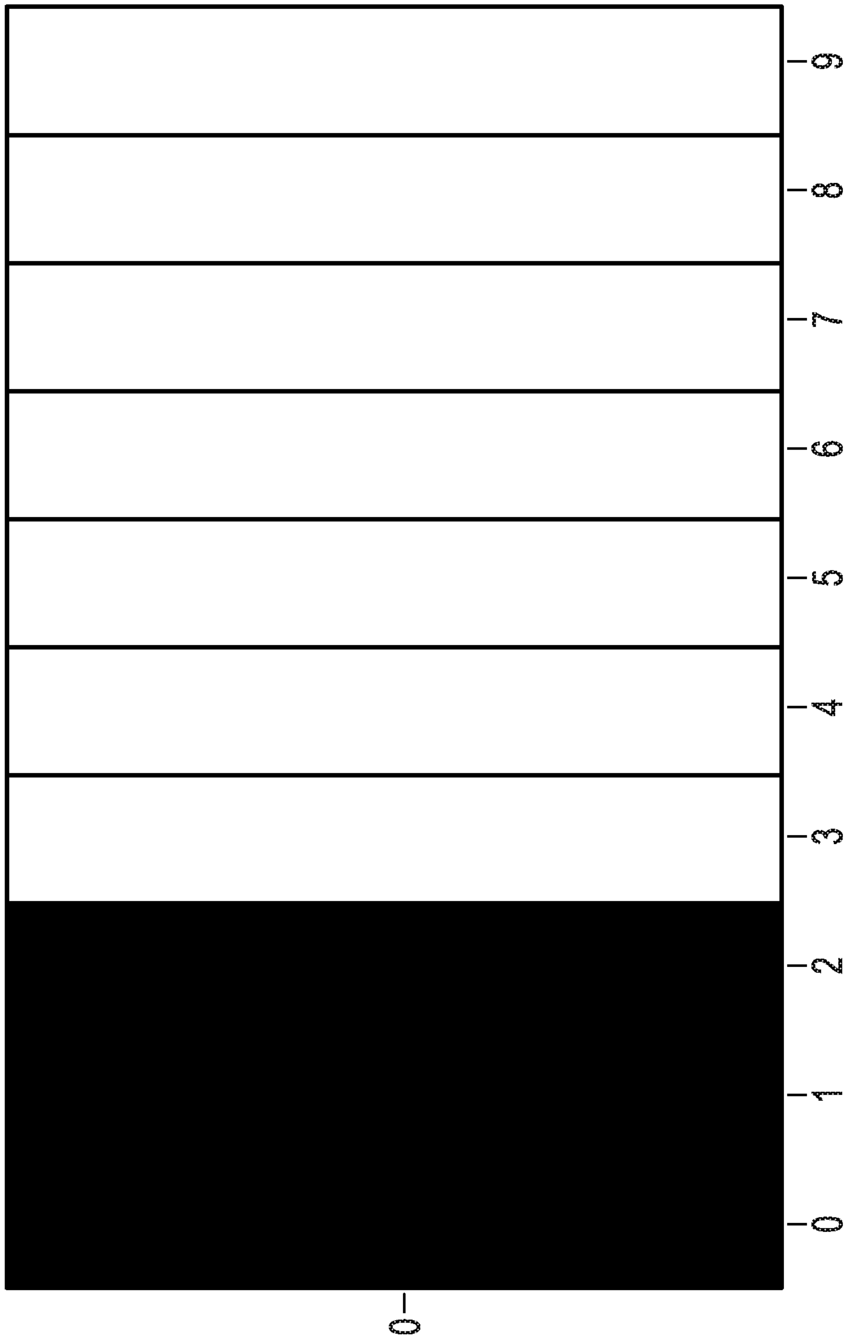
FIG. 8 illustrates the Euclidean distance between the signals experiences by all combinations of cells.
Figure 9:
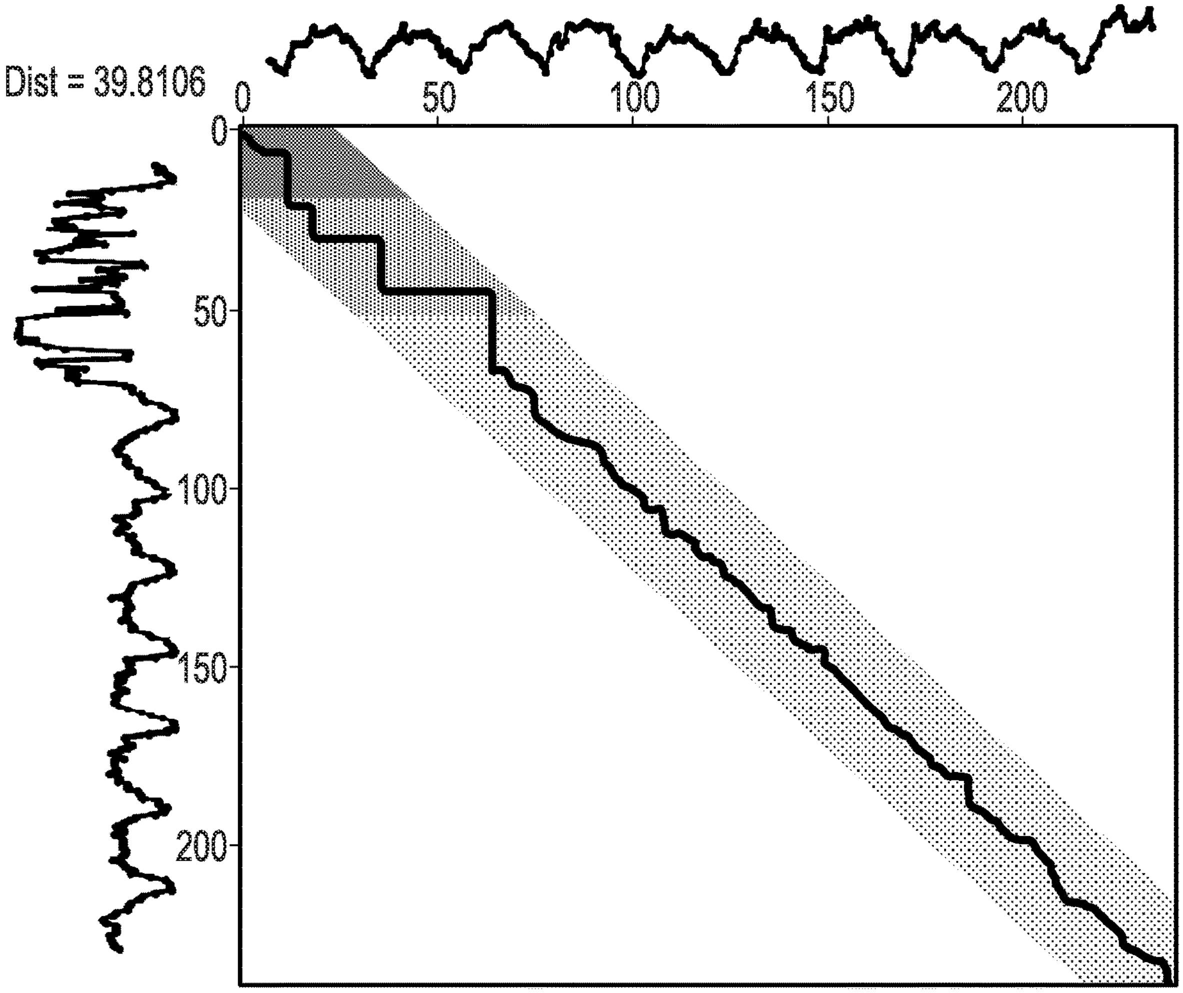
FIG. 9 illustrates the Euclidean distance between the first cell and one of the neighbor cells.

FIGS. 7 to 9 will now be used to describe a time series distance based model that may be used as one of the plurality of anomaly detection models. This model will be described with reference to PIM noise events in cells. However, it will be appreciated that a time series distance based model may be equally applied to other systems or applications, such as those described above.

As can be seen from FIG. 7, the signal of the first cell (indicated by the dotted line) which is subjected to a PIM noise event is not correlated (during the time period associated with the PIM noise event) with the signals received the from rest of the cells (indicated by the dotted and dashed line, thicker solid line, and thinner solid line) which are unaffected by the PIM event. In this particular example, the first three days show that interference is only high on the first cell, but not on the neighbor cells.

In order to capture such temporal similarity/dissimilarity patterns, a time series distance based model e.g. Dynamic time warping (DTW) may be used.

A DTW algorithm measures the similarity between two temporal sequences of varying lengths. The optimal match between two sequences is based on a dynamic programming approach, along with an additional locality constraint.

The normalized (Euclidean) distance across all combinations of cells can be used as metric (denoted by $D_1$, $D_2$, $D_3$, . . . $D_K$). This metric may be input into an anomaly estimator which turn forms an output representative of the exact cell and temporal region affected by the PIM event (e.g. represented by $H_1$, $H_2$, $H_3$, . . . , $H_K$).

FIG. 8 illustrates the Euclidean distance between the signals experiences by all combinations of cells. In this figure only one combinations of a pair of cells is indicated for clarity. This example may for instance illustrate the difference between the first cell and a neighbor cell. The y axis indicates different days.

Each box is then either shown as black or white. Those boxes with that are black indicate that the Euclidean distance between the signals is small. The boxes that are white indicate that the Euclidean distance between the signals is large. Therefore, the white in the boxes during the days 0 to 2 indicate that the first cell is experiencing more interference than the neighbor cell. It will be appreciated that if the first cell experiences may interference than all of the neighbor cells during days 0, 1 and 2 then it is likely that the first cell is experiencing a PIM event during the days 0, 1 and 2.

In this case therefore, the DTW model was able to correctly show increased distance on the first three days.

FIG. 9 illustrates the Euclidean distance (illustrated by the curve 901) between the first cell and one of the neighbor cells. Again, the curve 901 illustrates a greater difference between the signals on the first two days.

It will be appreciated that other time series distance-based approaches, for example Elastic matching, may also be used.

FIGS. 10 to 11 will now be used to describe a frequency based model that may be used as one of the plurality of anomaly detection models. This frequency based model will be described with reference to PIM noise events in cells. However, it will be appreciated that a frequency based model may be equally applied to other systems, such as those described above.

In general, stationary signals don't change their mean or variance over the time. They may contain multiple frequencies, but these frequencies should be distributed equally throughout the time-period. A Fourier Transform may be used to transform a stationary signal from the time domain to the frequency domain.

Frequency domain analysis may then be used to understand which frequencies are present in the signal and how prominent each frequency is. A Machine Learning (ML) classifier can be set on top of the features that can be extracted from the frequency domain (for example, the peaks of the amplitude of frequencies, the location of the peaks etc.). Thus, the underlining time series signal can be distinguished.

Unfortunately, real time signals are not stationary. That is, multiple frequencies may be present in different parts of the signal. To understand such signals, the transformation may be required to provide information about what are the frequencies present, and also, the time at which the frequencies are present.

In the example of PIM noise events, the time series signals that are obtained from different cells, are typical examples of real-time non-stationary signals. Hence, short time analysis of the signals is considered so as to be able to study both the temporal and frequency characteristics. Some techniques which consider frequency domain characterizations are filter-bank techniques such as STFT and wavelet transforms.

The basic equation of a Wavelet Transform $X_{a,b}$ is, $$X_{a,b} = \int_{-\infty}^{\infty} x(t)\varphi_{a,b}(t)dt$$

where x(t) is the input signal, $\varphi_{a,b}$ is the mother wavelet, a is the scaling factor and & is the shifting factor. The scaling factor is the parameter which determines how much the wavelet needs to stretch or shrink in time. The scale factor is inversely proportional to frequency and the equivalent frequency may be calculated using following equation.

$$F_{eq} = \frac{C_f}{a\delta t}$$

where $C_f$ is called the central frequency of a wavelet and $\delta_t$ is the sampling interval. Whenever the scaling factor is increased by 2, the frequency reduced by an octave.

The shifting factor deals with delaying or advancing the wavelet along the length of the signal.

The Wavelet Transform may therefore be rewritten as follows, $$X_{a,b} = \int_{-\infty}^{\infty} x(t)\varphi\left(\frac{t-b}{a}\right)dt$$

There are two types of Wavelet Transforms, a) Continuous WT (CWT) and a Discrete WT (DWT). The type of WTs may be selected based on the application.

In this example, where the application comprises time frequency analysis of the PIM affected signal, CWT may be selected.

The selection of a mother wavelet may be performed based on the application/input signal. In this example, as PIM noise events causes overshoots which present as peaks, one reasonable selection for a mother wavelet is a Morlet wavelet. A Morlet wavelet is suitable for CWT. The equation of a Morlet wavelet is:

$$\varphi(x) = e^{\frac{-x^2}{2}}\cos(5x)$$

It will be appreciated that different mother wavelets may be selected for different applications.

For the PIM noise event application, it is known that the noise which is added to the signal during the dynamic interference mostly causes high frequencies. Thus, the scaling factor of the Wavelet Transform may be adjusted to examine only the higher frequencies present. Again, it will be appreciated that the scaling factor may be adjusted differently for different applications.

For the PIM noise event application, the hypothesis may be that cells under normal working conditions would have less or no high frequency components, whilst cells confronting dynamic interference would be exhibiting high frequencies. On analyzing higher frequencies and locating them in time using the Wavelet Transform, the model may differentiate the underlining time series signals, and thus detect the noisy signals.

In some examples, other transforms of a signal into the time-frequency plane such as Short time Fourier transform coefficients may be used instead of wavelet transform coefficients. It will be appreciated that any uniform/non-uniform filter-bank techniques may be used to capture the frequency and temporal aspects of the signals.

FIGS. 10*a* to 10*d* illustrates a CWT on high frequencies present in signals (1001, 1002, 1003 and 1004) from different cells. The black spikes indicate times in which high frequencies were present. Due to the binarization of these figures into black and white, some of the data has been lost.

Figure 10A:
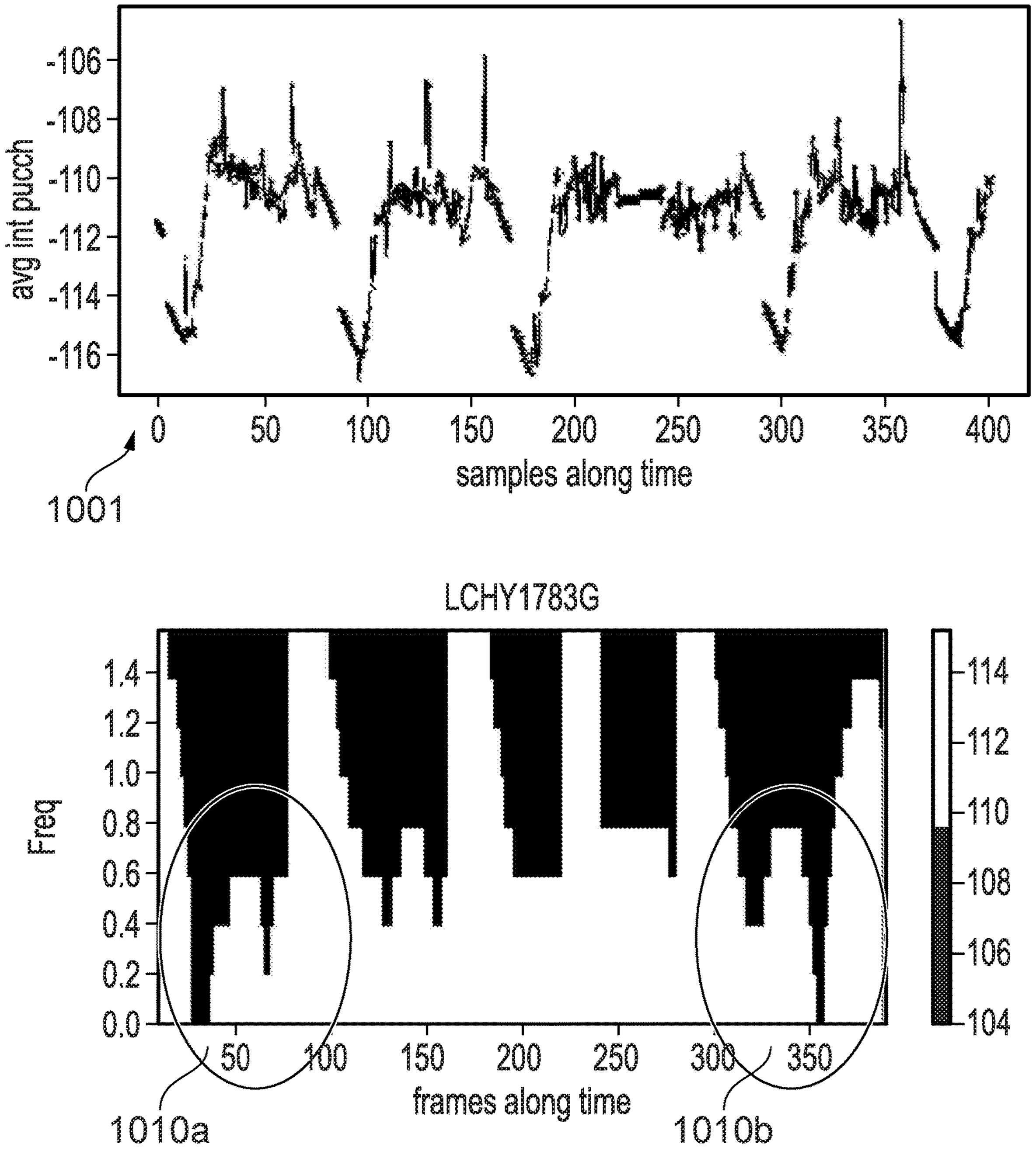
FIGS. 10*a* to 10*d* illustrate a CWT on high frequencies present in signals (1001, 1002, 1003 and 1004) from different cells.

In FIG. 10*a*, for signal 1001, two spikes 1010*a* and 1010*b* were noted at around frame 50 and frame 350.

Figure 10B:
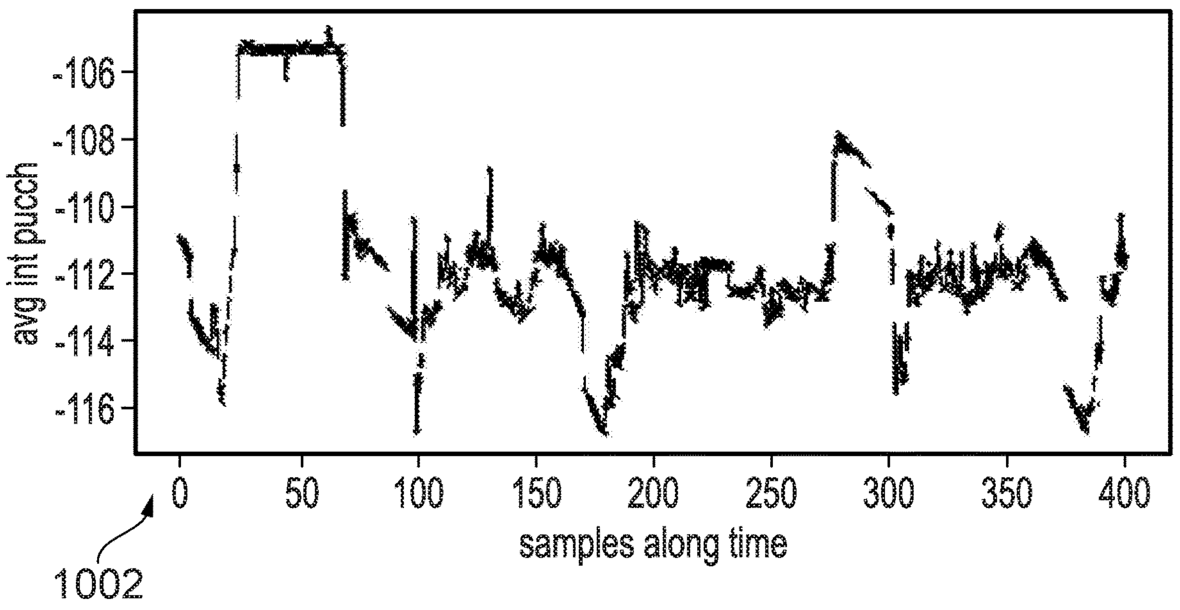
Figure 10B:
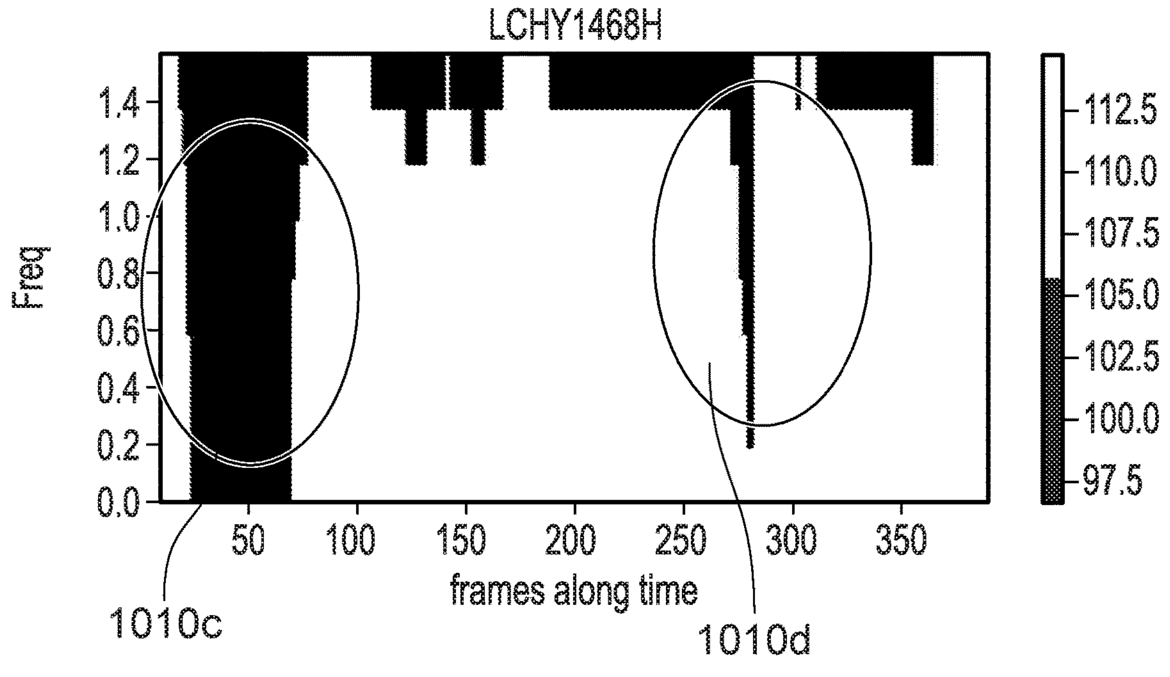

In FIG. 10*b*, for signal 1002, two spikes 1010*c* and 1010*d* are noted at around frame 50 frame and around frame 270.

Figure 10C:
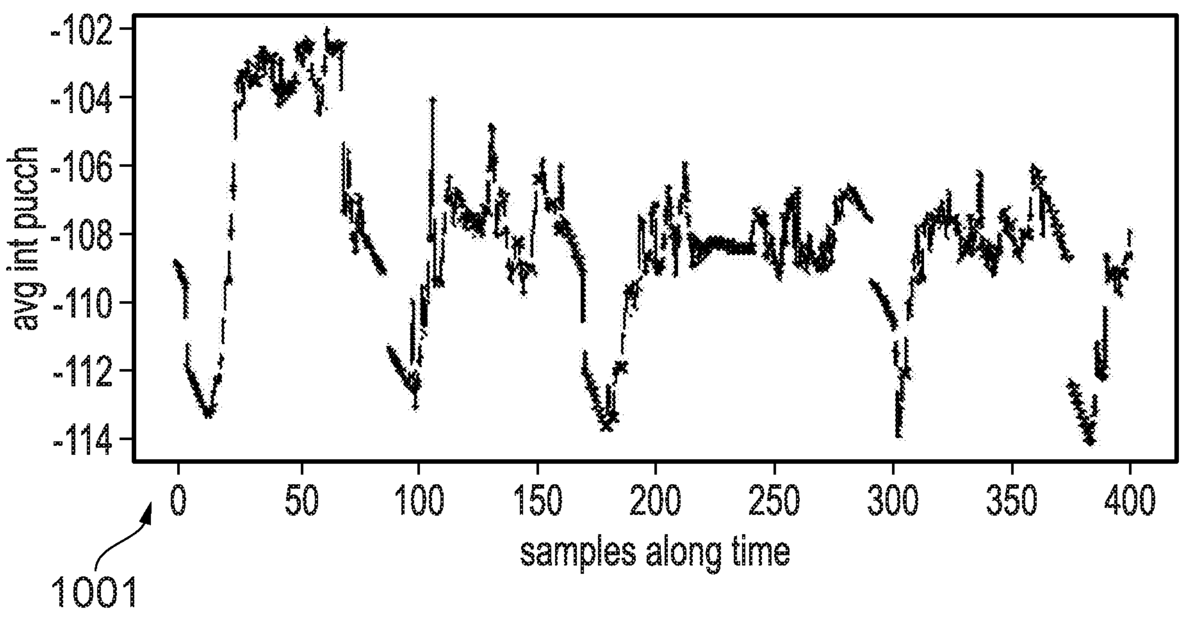
Figure 10C:
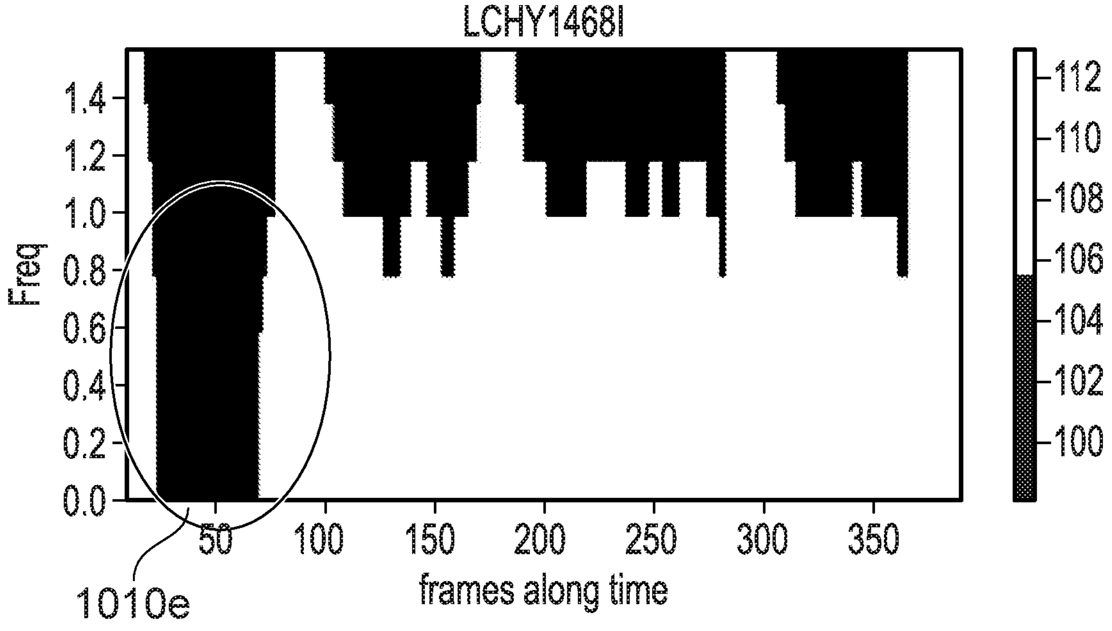

In FIG. 10*c*, for signal 1003, one spike 1010*e* is noted at around frame 50.

Figure 10D:
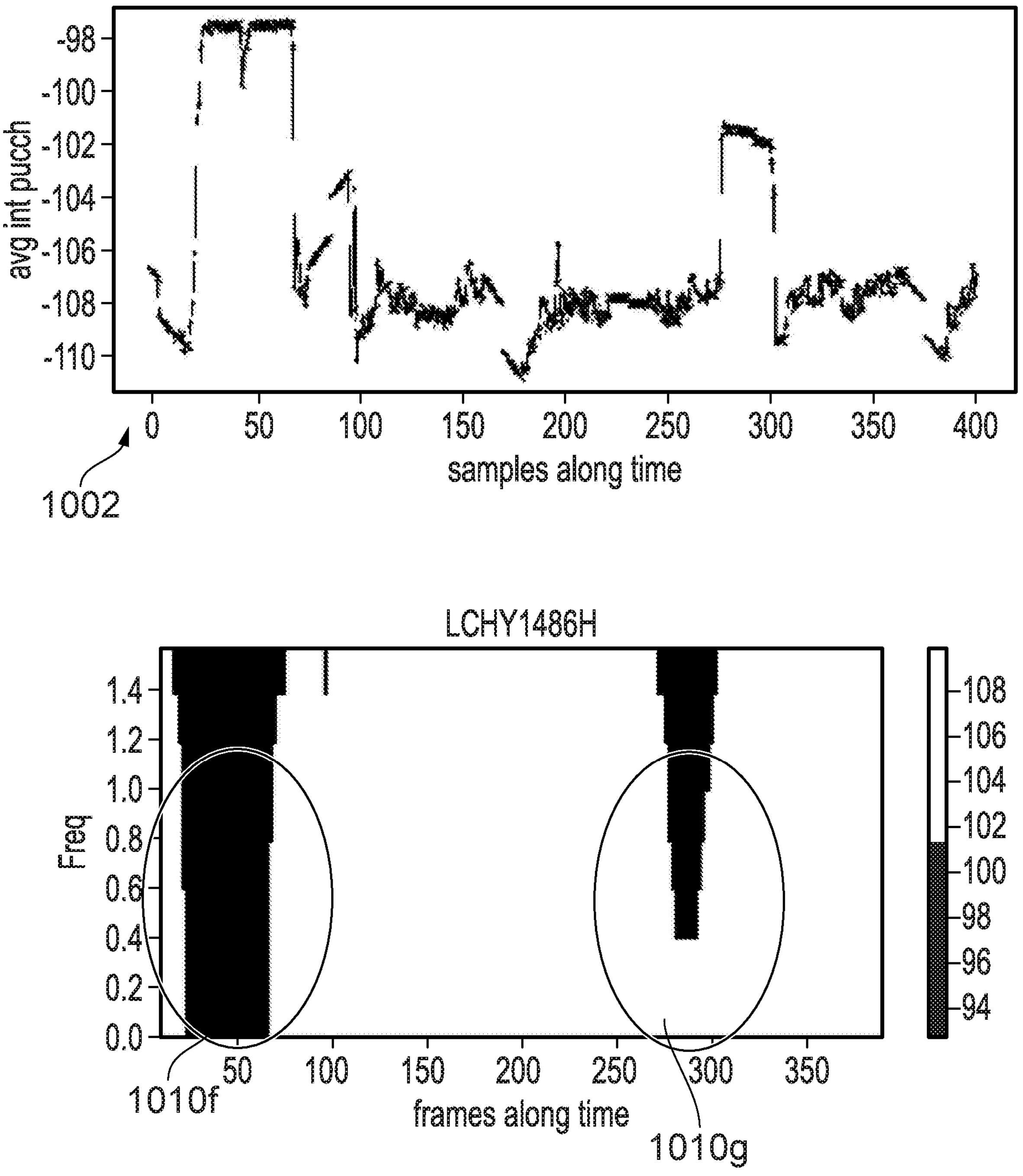

In FIG. 10*d*, for signal 1004, two spikes 1010*f* and 1010*g* are noted at around frame 50 and around frame 270.

Therefore, all cells experience the noise event at frame 50, the cells producing signals 1002 and 1004 experience the noise event at around 270, but one the cell producing the signal 1001 experiences the noise event at around frame 350. The noise event 1010*b* may therefore be likely to be a PIM event.

FIGS. 11*a* to 11*d* illustrate STFT plots depicting the high frequencies for the noisy signals (1101, 1102, 1103 and 1104) from different cells. Black spikes indicate times when the noise was high. Due to the binarization of these figures into black and white, some of the data has been lost.

Figure 11A:
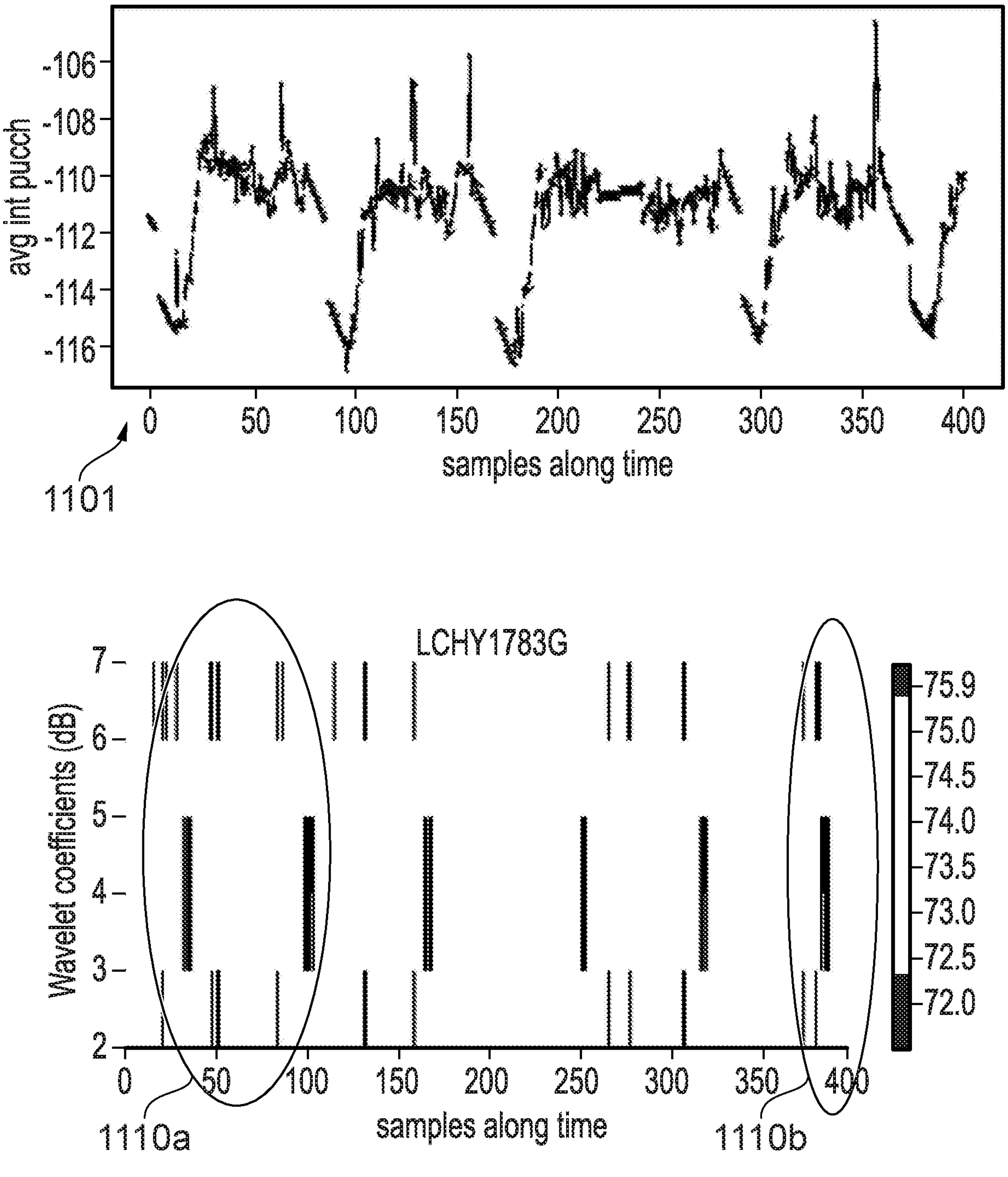
FIGS. 11*a* to 11*d* illustrate STFT plots depicting the high frequencies for the noisy signals (1101, 1102, 1103 and 1104) from different cells.

In FIG. 11*a*, for signal 1101, two spikes 1110*a* and 1110*b* were noted at around sample 50 and sample 370.

Figure 11B:
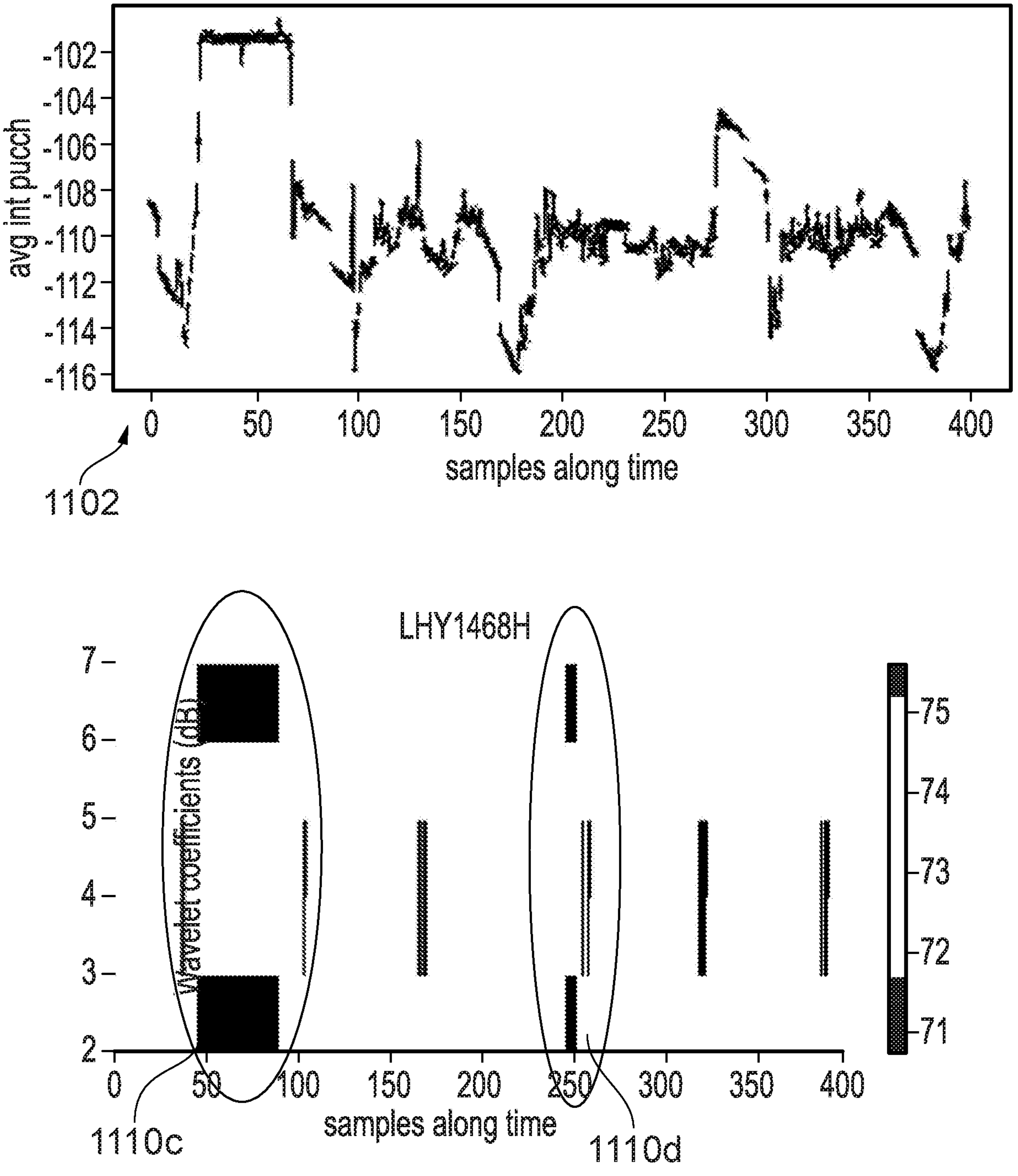

In FIG. 11*b*, for signal 1102, two spikes 1110*c* and 1110*d* are noted at around sample 50 sample and around sample 250.

Figure 11C:
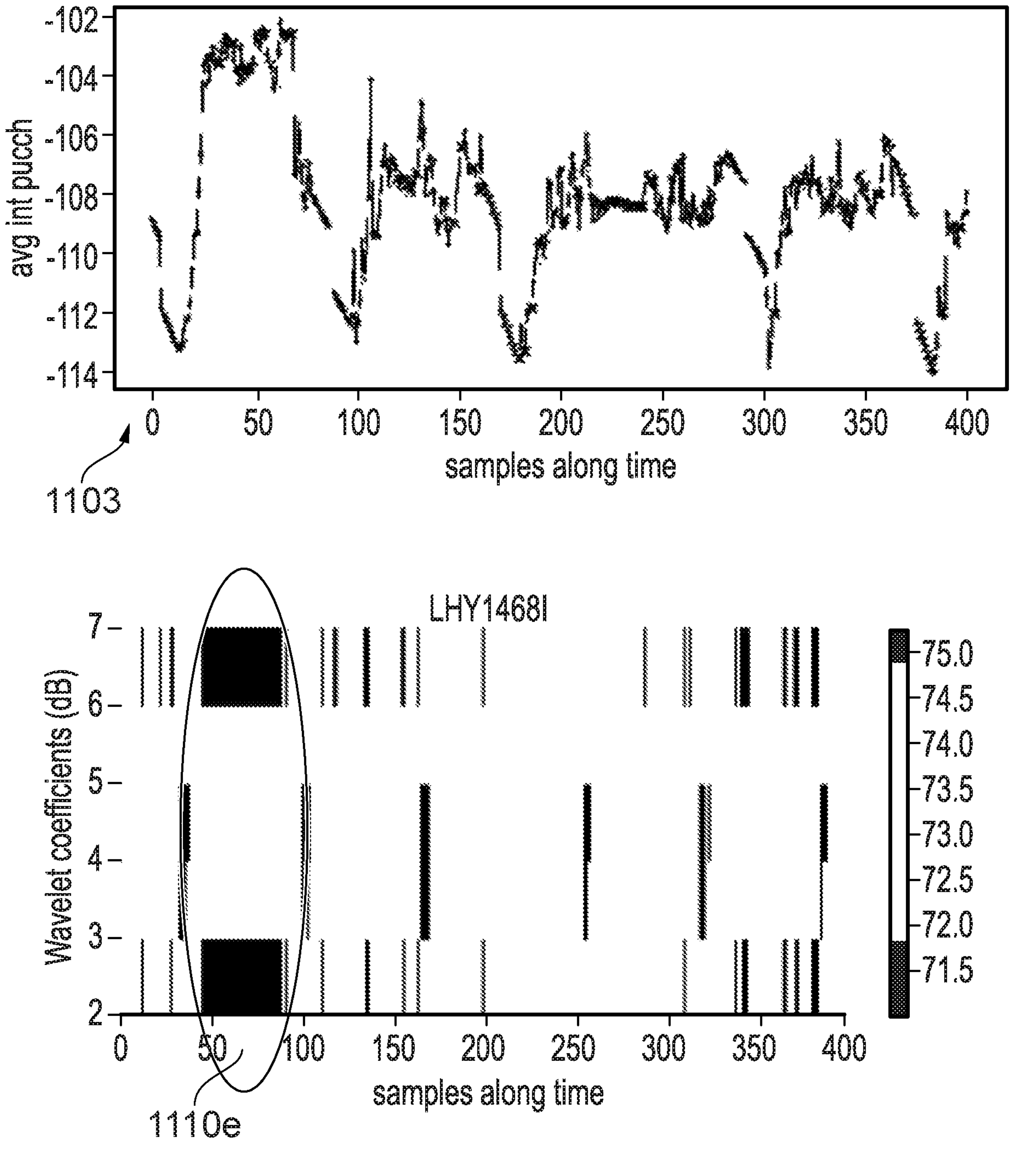
Figure 11D:
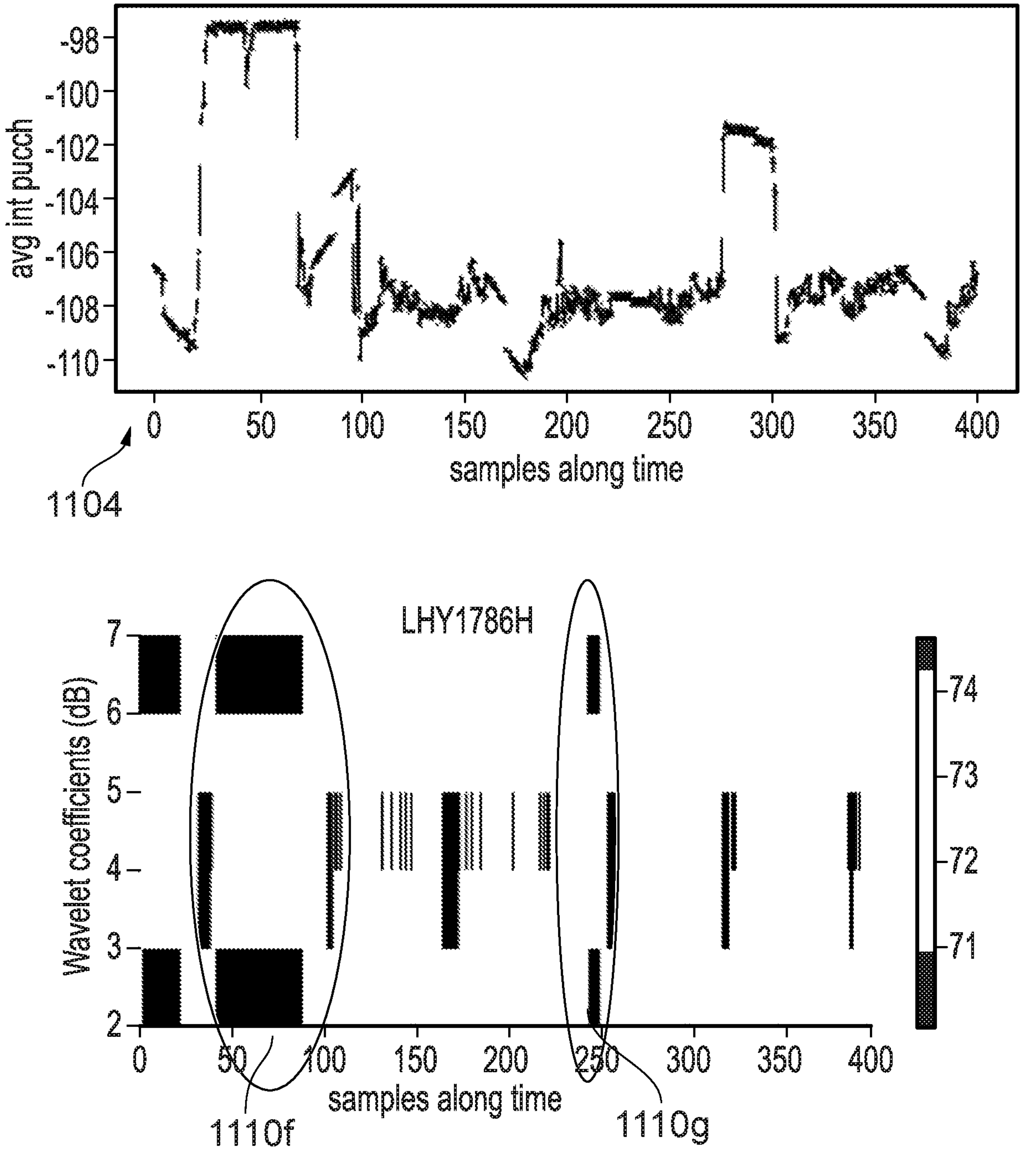

In FIG. 11*c*, for signal 1103, one spike 1110*e* is noted at around sample 50.

In FIG. 10*d*, for signal 1104, two spikes 1110*f* and 1110*g* are noted at around sample 50 and around sample 250.

Therefore, all cells experience the noise event at sample 50, the cells producing signals 1102 and 1104 experience the noise event at around sample 250, but one the cell producing the signal 1101 experiences the noise event at around sample 370. The noise event 1110*b* may therefore be likely to be a PIM event. From FIGS. 10 and 11 it can be seen that signals with high frequencies present can be clearly differentiated from others. The continuous wavelet transforms may also be further processed to determine dense vectors which may then be used to predict the following:

1. Whether the cell is experiencing dynamic interference or not
2. Whether the uplink noise rise of a cell is different from the neighbor cells or not.
3. Whether the cell is anticipating similar dynamic interference to it's neighbor cells.

An anomaly estimator model may then receive the Wavelet Transform coefficients (denoted by $X_1, X_2, X_3 \ldots X_K$) as input features. The anomaly estimator model may then use the Wavelet Transform coefficients to output estimates of which cell, and which time period of the cell, is affected by PIM (represented by $F_1, F_2, F_3, \ldots F_K$).

Figure 12A:
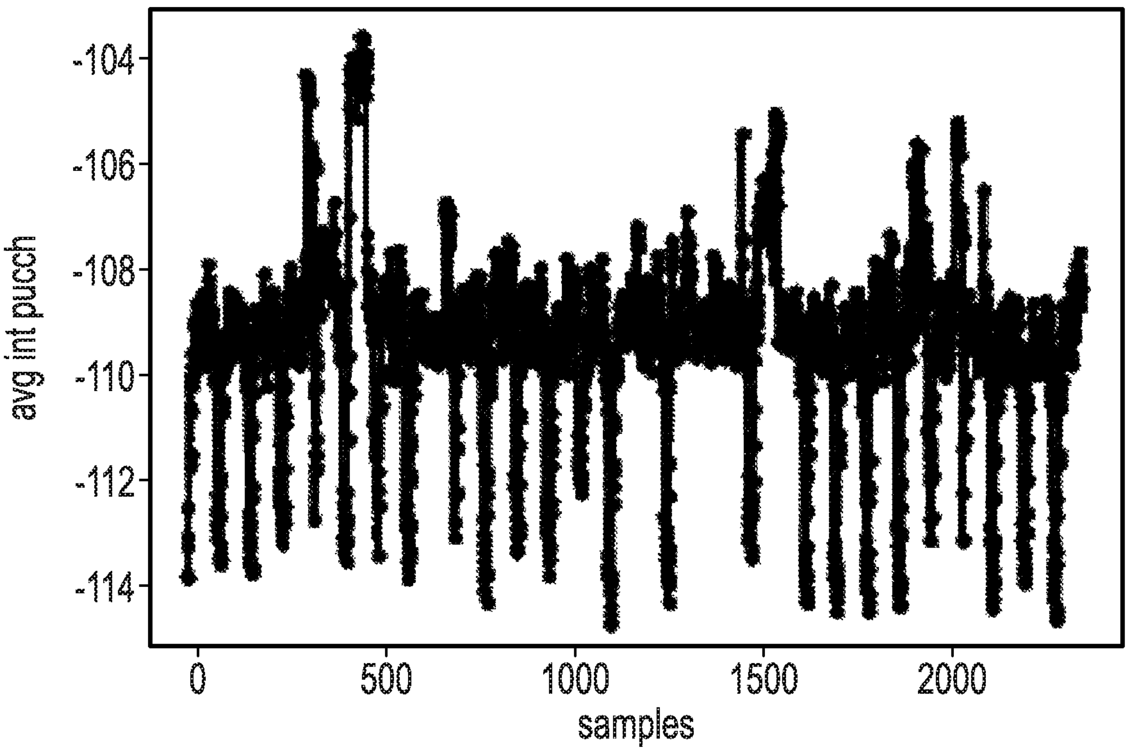
FIG. 12*a* illustrates the average interference in PUCCH for a cell (data over 30 days)
Figure 12B:
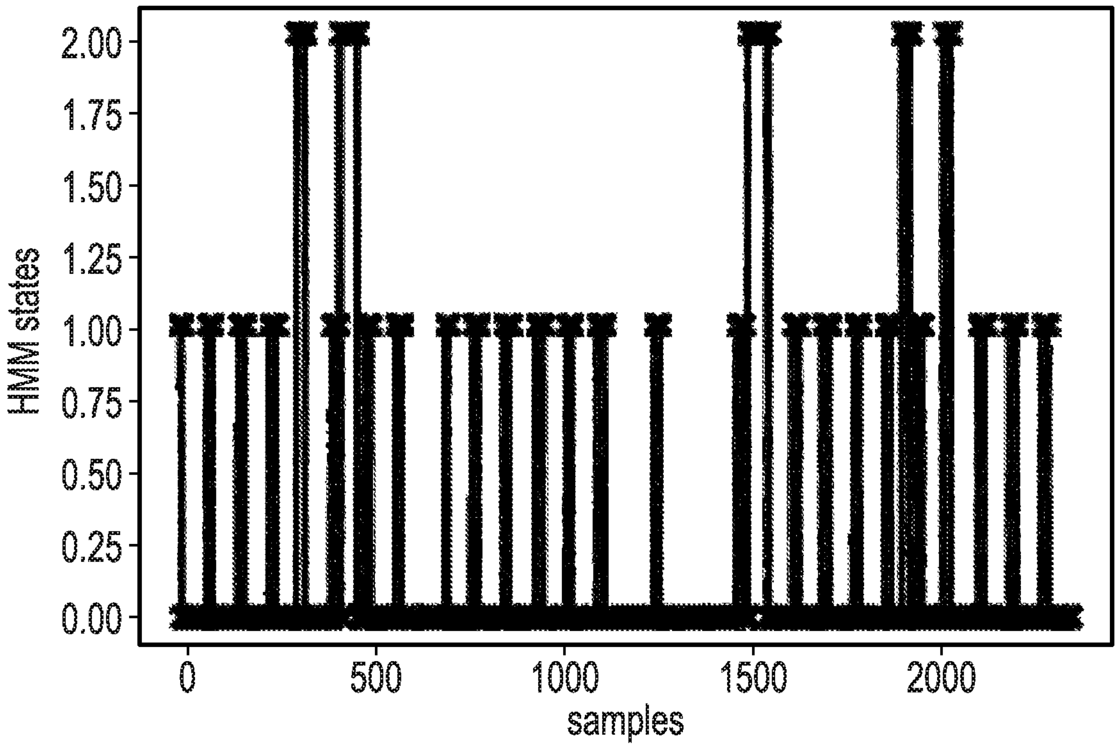
FIG. 12*b* illustrates states of the HMM depicting the detection of PIM type of noise.

FIGS. 12*a* and 12*b* will now be used to describe a sequence based model that may be used as one of the plurality of anomaly detection models. This sequence based model will be described with reference to PIM noise events in cells. However, it will be appreciated that a sequence based model may be equally applied to other systems, such as those described above.

The states of a signal may be considered to be latent. The sequence of the states may therefore be inferred in order to detect the presence of PIM-type of noise.

With a Hidden Markov Model (HMM), the latent state has the Markov property (which means that the evolution of the Markov process in the future depends only on the present state and does not depend on past history), and the observed variables are dependent on the latent state.

In this approach, the noisy signal, $x_1, x_2, x_3, \ldots, x_K$ forms the observations of the HMM and the latent states of the model ($s_1, s_2, s_3, \ldots s_N$) are indicative of the noisy signal regions of the observations.

The state decoding of a signal from a first cell (illustrated in FIG. 12*a*) using a 3-state Gaussian Mixture Model (GMM) HMM (where the emission probability of each state is assumed to be in the form of GMM) is depicted in the FIG. 12*b*.

In other words, FIG. 12*a* illustrates the average interference in PUCCH for a cell (data over 30 days), and FIG. 12*b* illustrates states of the HMM depicting the detection of PIM type of noise.

A HMM is defined by the triplet $\Theta=(\pi, A, B)$ where $\pi_m$ represents initial probabilities of states $s_m$ being the first state of a state sequence, A represents the state transition probability matrix with elements $a_{mn}=P(S_t=s_n|S_{t-1}=s_m)$, m ε (1,M), and B denotes the emission probability matrix with elements $b_{ij}=P(x_t=v_t|S_t=s_j)$, i ε (1,l). Given an HMM model, θ, the Viterbi algorithm obtains the path corresponding to that which maximizes the likelihood of the observation i.e., $$\delta_t(m) = \max_m \delta_{(t-1)}(n) \cdot a_{mn} \cdot b_{im},\ t \in (1, K),\ m \in (1, M).$$

In this example, M (the number of possible states) and I (the channel memory or, in other words, the depth of the tree as the transitions take place) are both set to 3. The state 0 of the decoding is indicative of signal interference during busy hours, state 1 is indicative of the dips in the signal and is mostly observed during night slots while state 2 is indicative of interferences that can occur at any time.

At times when the HMM states are 2, these times are where the cell is possibly experiencing a PIM noise event.

In this example, the states of the signal modelled by an HMM is decoded using Viterbi decoding technique. It is to be noted that such a formulation doesn't require any explicit labelling. It is possible to use other generic time series models from which latent state can be inferred, for example, Bayesian networks and conditional random fields.

Figure 13:
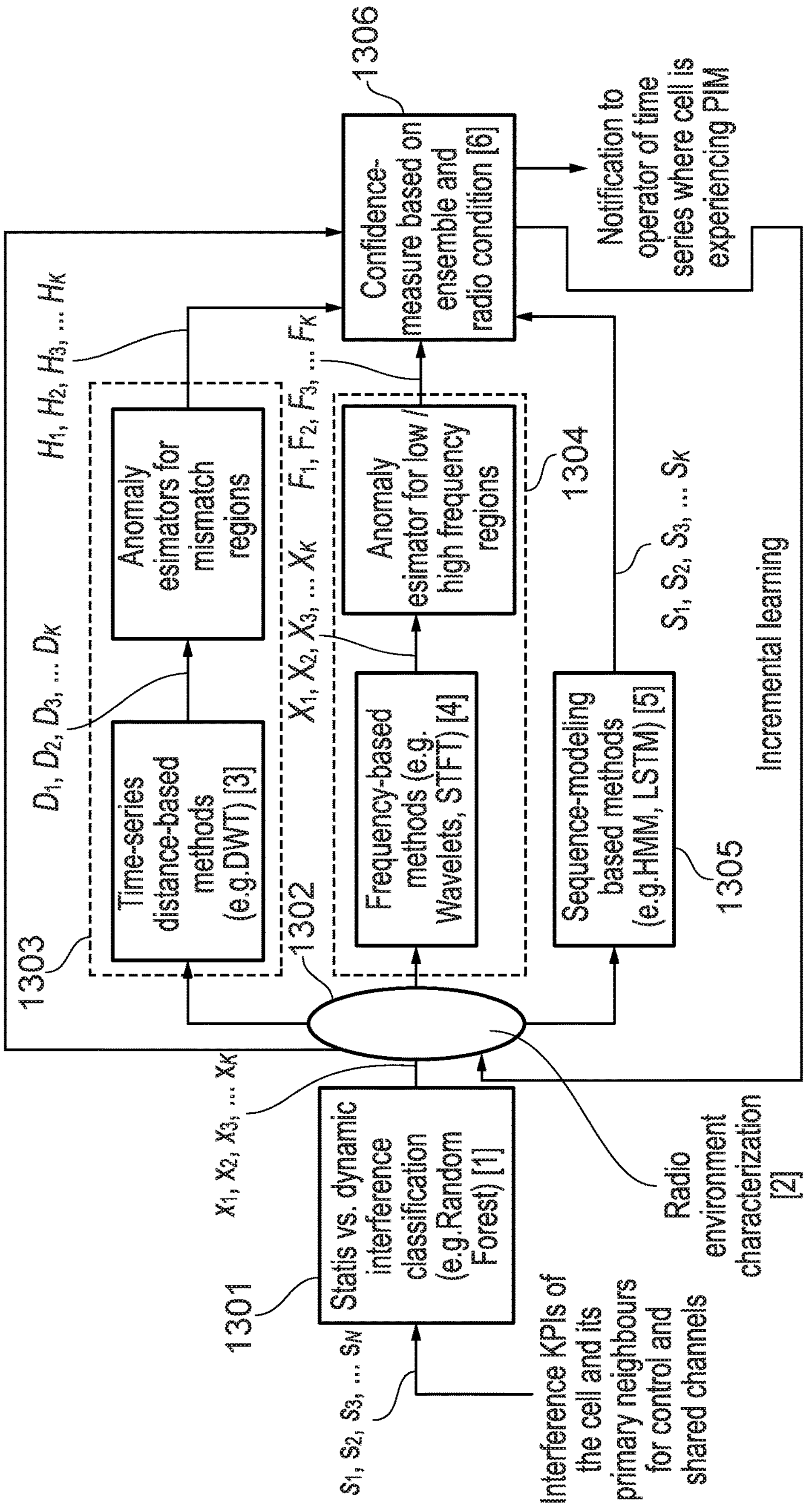
FIG. 13 illustrates a block diagram of an apparatus for implementing the method of FIG. 3.

FIG. 13 illustrates a block diagram of an apparatus 1300 for implementing the method of FIG. 3. The apparatus may comprise a physical or virtual node, and may be implemented in a computing device or server apparatus and/or in a virtualized environment, for example in a cloud, edge cloud or fog deployment. It will be appreciated that the functions of the apparatus may be distributed across may nodes in a network.

Consider a set of entities be denoted by $s_1, s_2, s_3 \ldots s_N$.

Firstly, the data from each entity is received at a classification module 1301. As described with reference to step 601 of FIG. 6, the data may be indicative of whether or not an anomalous event is occurring at each of the plurality of entities over a first time period (e.g. indicative of whether or not a PIM noise event is occurring at each of the plurality of cells over a first time period).

The classification module 1301 classifies the entities as either experiencing static data or dynamic data. Responsive to classifying the data received from an entity as dynamic data, the classification module 1301 may determine that the entity is experiencing an anomalous event during periods in which the data is dynamic.

In some examples, the classification module may be implemented by a Random Forest based classifier that has been trained to identify entities that are providing dynamic data patterns.

The window for training and testing such a Random Forest based classifier may be varied from anywhere between 2-5 days. On unseen test cells, an experimental version of the classifier provided 94% accuracy on 1000 cells.

In this example, the entities identified as experiencing dynamic data are denoted by $x_1, x_2, x_3, \ldots, x_K$.

It will be appreciated that other classification techniques may be used, but L1-norm based classification helps to isolate the static regions of interference well, as it is constant in time and energy levels.

The data received from the entities experiencing dynamic data is then passed to the characterisation model 1302.

As described with reference to step 602 of FIG. 6, the characterisation model 1302 characterises the system (e.g. the plurality of cells) as one of:

1) a system in which only the first entity is experiencing an anomalous event at any one time, e.g. only the first cell is experiencing a PIM event at any one time;

2) a system in which two or more of the plurality of entities are experiencing anomalous events occurring at any one time, e.g. all (or most) of the cells are experiencing very transient interference; and 3) a system for which during at least one second time period within the first time period data is missing for one or more of the plurality of entities, e.g. one or more of the cells intermittently have missing data.

The characterisation model 1302 may be implemented as a machine learning model, for example a neural network. The characterisation model may be configured to check if the noise contributed by a particular entity at a particular time is more than the noise contributed by the other entities at the particular time.

As described with reference to step 603 of FIG. 6, one or more of a plurality of anomaly detection models may then be used to compare the data received from the first entity to the data received from other entities in the plurality of entities. For example, one or more of the anomaly detection models 1303, 1304 and 1305 may be used to compare the data received from the cells $x_1, x_2, x_3, \ldots, x_K$.

Each of the plurality of anomaly detection models may be of a different type. For example, the anomaly detection model 1303 comprises a time series distance based model (in this example DTW), the anomaly detection model 1304 comprises a frequency based model (in this example a wavelet transform model) and the anomaly detection model 1305 comprises a sequence based model (in this example a HMM).

In some examples, based on the characterization of the system, one or more of the plurality of anomaly detection models may be selected. For example, this approach may be chosen if the characterization of the system is known (e.g. not estimated). In this example, the computational complexity may be less as not all of the plurality of anomaly detection models will be employed in all scenarios.

For example, as will be illustrated below with reference to FIG. 16, frequency based models perform better than other types of model when the system is characterized as a system for which during at least one second time period within the first time period data is missing for one or more of the plurality of entities. In this case therefore, the apparatus 1300 may select to utilize only the frequency based model to perform the comparison of step 603.

Responsive to the system being characterized as a system in which only the first entity is experiencing an anomalous event at any one time the apparatus may select to utilize any (or all) of the anomaly detection models, as (as will be described later with reference to FIG. 14) all of the types of models perform well in this scenario.

Responsive to the system being characterized as a system in which two or more of the plurality of entities are experiencing anomalous events occurring at any one time the apparatus may select to utilize all of the anomaly detection models as, in this scenario, none of the models are reliably able to detect whether the anomaly is localized (as illustrated in FIG. 15). Therefore, in this scenario, the apparatus may select to make use of an ensemble of the models, where the output of each model is associated with a confidence value (as will be described later) indicative of how likely it is that the output of the model is correct.

However, if characterization of the system is unknown (e.g. estimated), then the characterisation model may be trained continually. Based on this, the apparatus may select to employ all of the plurality of anomaly detection models 1303, 1304 and 1305 regardless of the characterisation of the system.

The anomaly detection models 1303, 1304 and 1305 may be configured to output estimates of which entity is experiencing a local anomalous event, and when the entity is experiencing the local anomalous event. It will be appreciated that the anomaly detection model 1303 may be configured to operate as described above with reference to a DTW model, the anomaly detection model 1304 may be configured to operate as described above with reference to a wavelet transform model, and anomaly detection model 1305 may be configured to operate as described above with reference to a HMM. It will also be appreciated that other types of model may be used.

It will be appreciated that, (as described with reference to step 604 of FIG. 6) responsive to an output of any of the one or more of the plurality of anomaly detection models indicating that the anomalous event has occurred locally at the first entity, the apparatus may determine that a local anomalous event has occurred at the first entity. The apparatus may then indicate that this local anomalous event has occurred at the first entity to an external entity, for example a network operator.

The outputs of each of the anomaly detection models 1303, 1304 and 1305 are received by a confidence module. The confidence module 1306 may also be configured to receive an indication of the characterization of the system The confidence model 1306 may be configured to assign a confidence level to the determination that the local anomalous event has occurred at the first entity, wherein the confidence level is based on the characterization of the system.

For example, responsive to the system being characterized as a system in which only the first entity is experiencing an anomalous event at any one time, the confidence module 1306 may assign a high confidence level to the output of any of the anomaly detection models. In other words, in this type of system, all of the types of anomaly detection models are reliable.

In another example, responsive to the system being characterized as a system for which during at least one second time period within the first time period data is missing for one or more of the plurality of entities, the confidence module 1306 may assign a higher confidence level to the output of the frequency based model 1304 than the other anomaly detection models 1303 and 1305. In other words, (as will be illustrated below), as the frequency based model 1304 performs better than the other types of model in scenarios in which data is missing for one or more of the plurality of entities, the output of the frequency based model 1304 may be assigned a higher confidence level in these scenarios.

It will be appreciated that the confidence model 1306 may also be implemented as a machine learning model, for example a neural network.

The confidence model 1306 may output the confidence level along with the indication that the local anomalous event has occurred, to an external entity.

The apparatus 1300 may then obtain an indication of whether the determination that the local anomalous event occurred at the first entity was correct. For example, a human operator may validate the results received from the apparatus 1300.

The characterization model 1302 may be adjusted based on the indication of whether the determination that the local anomalous event occurred at the first entity was correct. In other words the apparatus may adjust how the step of assigning a confidence level is performed responsive to the indication of whether the determination that the local anomalous event occurred at the first entity was correct For example, if the determination was incorrect, it may be assumed that the characterization model 1302 could have output the wrong characterization of the system. Therefore, weights in the neural network of the characterization model 1302 may be updated in response to this assumption.

Similarly, the confidence model 1306 may be adjusted based on the indication of whether the determination that the local anomalous event occurred at the first entity was correct. For example, if the determination was incorrect, the weights in the neural network of the confidence model 1306 may be adjusted such that the confidence level assigned to that anomaly detection model in that system characterization is lower than previously output.

In this way, both the confidence model 1306 and the characterisation model 1302 may be learnt incrementally from each other, at the expense of higher complexity where all the three approaches are considered. Both characterisation mode 1302 as well as confidence model 1306 provide checks and balances at the two ends of the apparatus 1300. The training and testing time may vary from 10 days to a few months.

It will also be appreciated that each of the anomaly detection models 1303, 1304 and 1305 may also be updated and or retrained based on the obtained indication of whether the determination that the local anomalous event occurred at the first entity was correct.

FIG. 14 illustrates the output from the three anomaly detection models 1303, 1304 and 1304 in a scenario (illustrated in FIG. 14*a*) in which a first cell (dotted line) is experiencing a PIM noise event, and the neighbor cells (circle and star lines) are in an otherwise low noise environment. In this example, it can be seen that all three anomaly detection models 1303, 1304 and 1305 perform well. For example, in FIG. 14*b* the frequency based model clearly illustrates black areas representative of higher frequencies at time 250, in correlation with the PIM event 1401. This crude binarization (into black and white) of the output of this method shows some extra peaks.

Figure 14A:
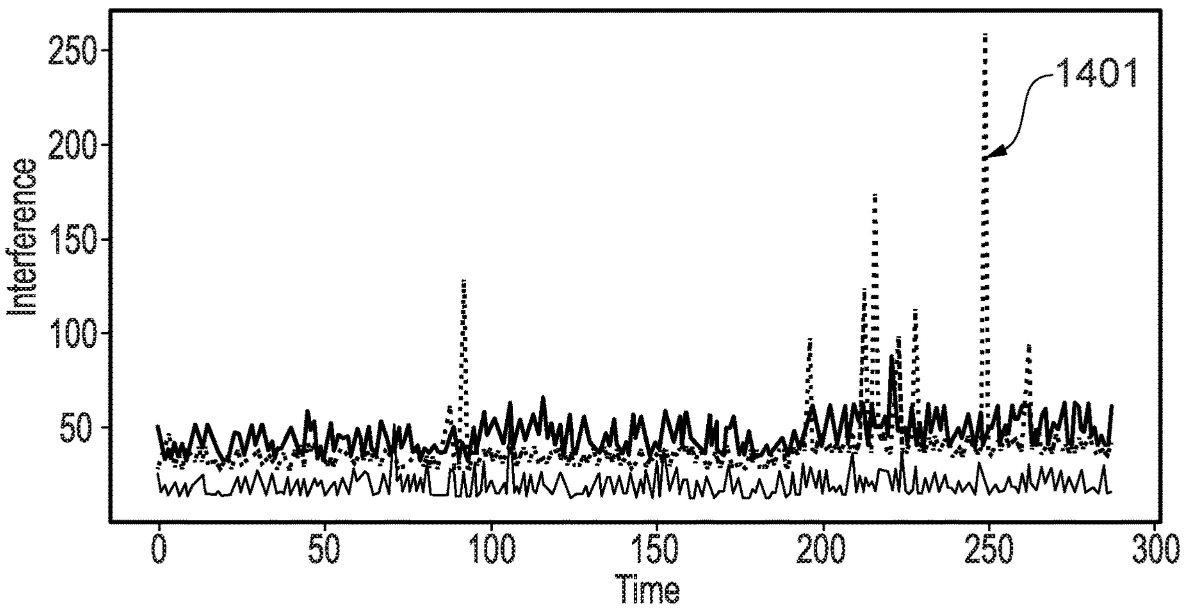
FIGS. 14*a* to 14*d* illustrate the output from the three anomaly detection models 1303, 1304 and 1304 in a scenario (illustrated in FIG. 14*a*) in which a first cell (dotted line) is experiencing a PIM noise event, and the neighbor cells (circle and star lines) are in an otherwise low noise environment.
Figure 14B:
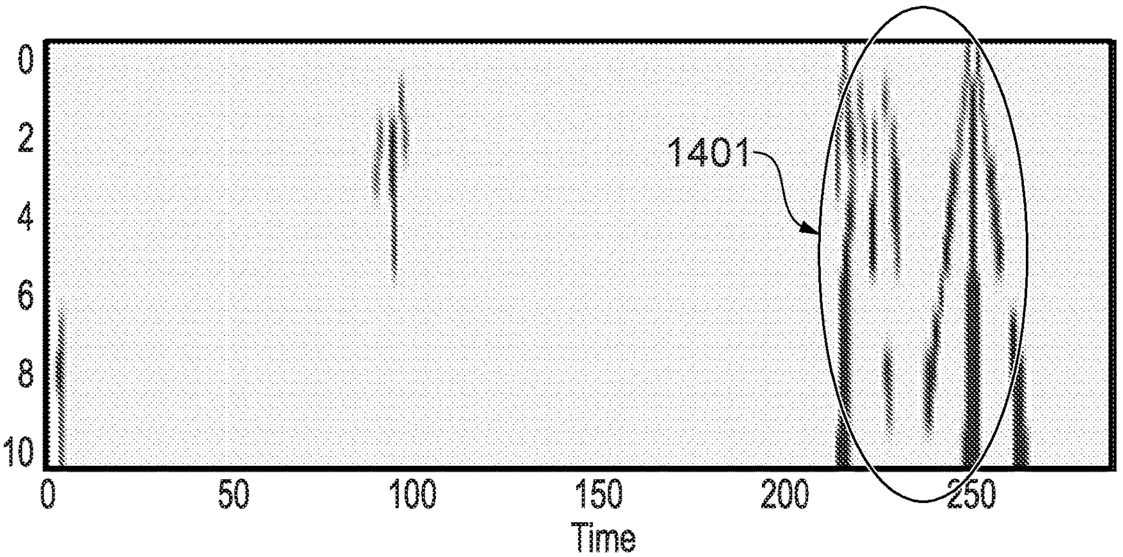
Figure 14C:
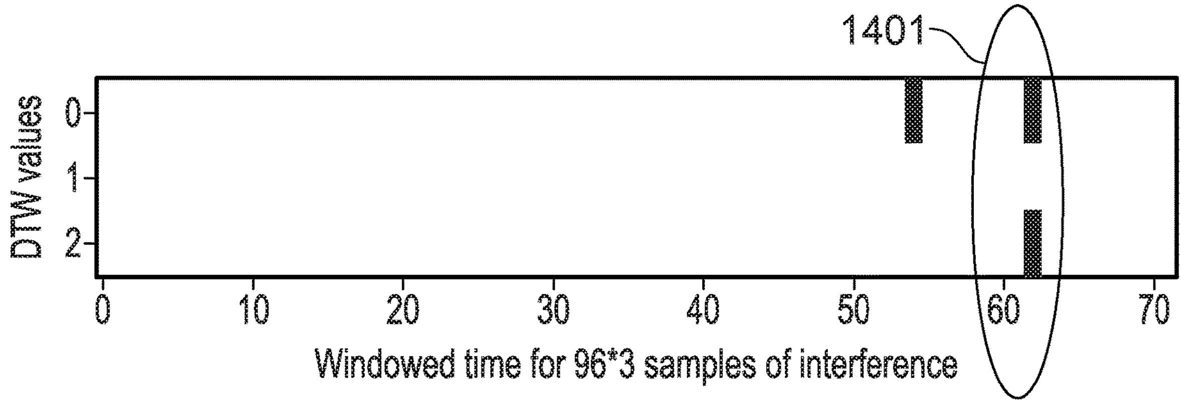

FIG. 14*c* illustrates how the time series distance based model is able to indicate a peak in line with the PIM event. In FIG. 14*c* only comparisons between three pairs of signals for clarity. Black boxes represent times in which the cell interference of one of a pair of cells is different from that of the other in the pair of cells. The crude binarization (into black and white) of this method is not able to show all peaks, but some peaks are shown. At time 250 of the PIM event 1401, the top and bottom rows illustrate black boxes, thereby indicating a peak.

Figure 14D:
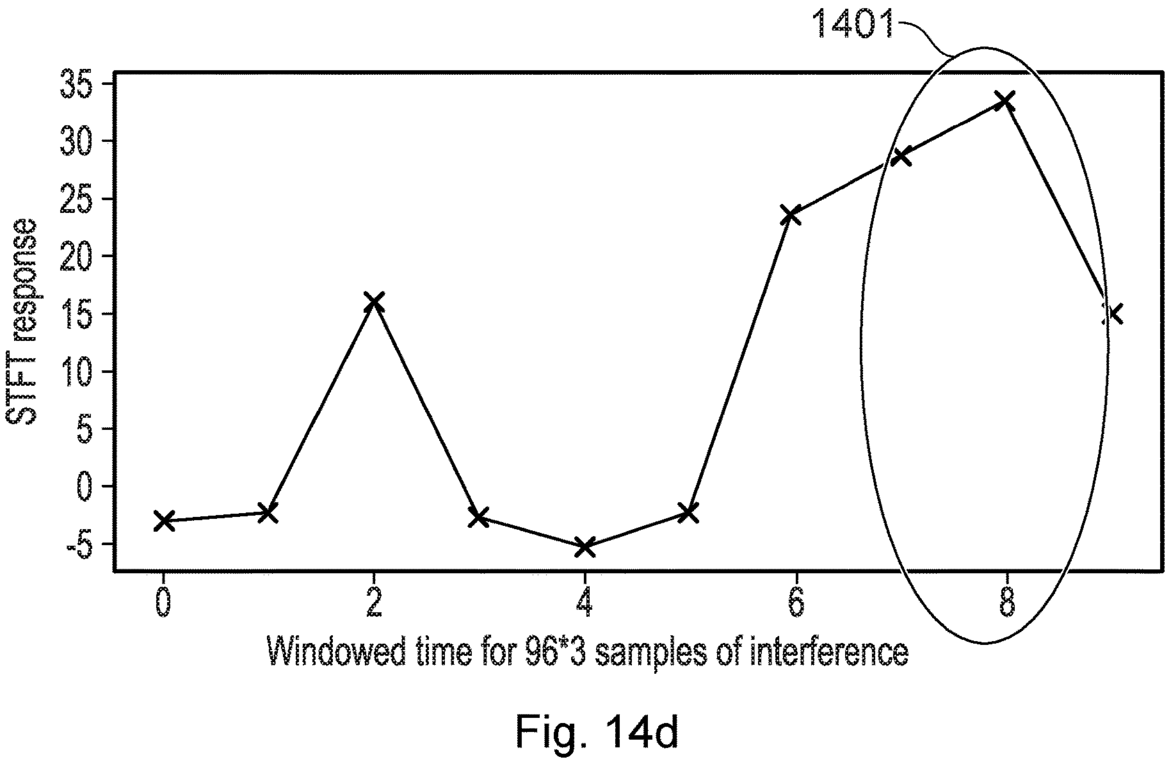

FIG. 14*d* illustrates how the sequence based model clearly indicates a peak in line with the PIM event.

FIG. 15 illustrates the output from the three anomaly detection models 1303, 1304 and 1304 in a scenario (FIG. 15*a*) in which a first cell (dotted line) is experiencing a PIM noise event 1501, and all neighbor cells (circle and star lines) are experiencing noisy interference. In this example, the individual models may not reliably provide a correct determination of whether the first cell is experiencing a PIM noise event.

Figure 15A:
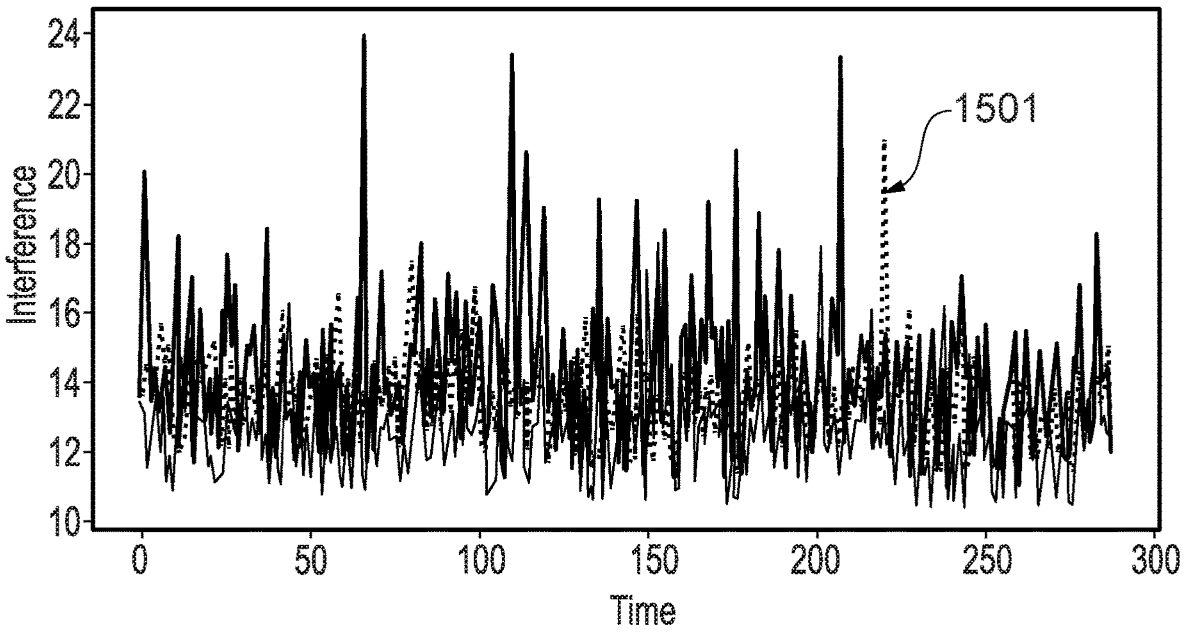
FIGS. 15*a* to 15*d* illustrate the output from the three anomaly detection models 1303, 1304 and 1304 in a scenario (FIG. 15*a*) in which a first cell (dotted line) is experiencing a PIM noise event 1501, and all neighbor cells (circle and star lines) are experiencing noisy interference.
Figure 15B:
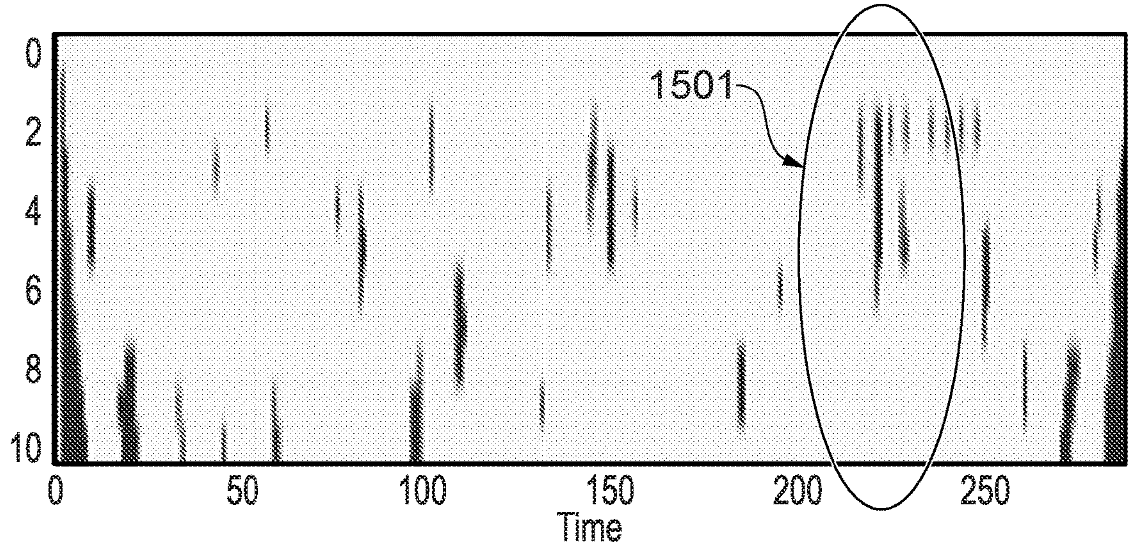
Figure 15C:
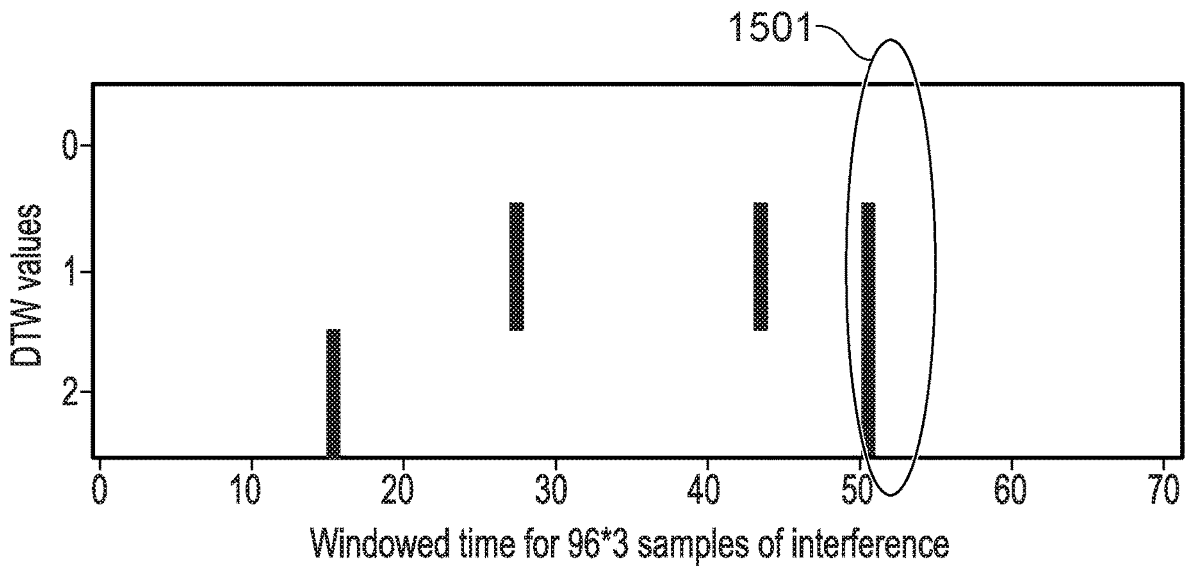

In the example illustrated, the time series distance based model 1303 is able to correctly indicate the days in which the first cell is experiencing the PIM noise event 1501 (as illustrated in FIG. 15*c*). In FIG. 15*c*, only comparisons between three pairs of signals for clarity. The black boxes indicate where the interference experienced by a cell is different from that of the other cell in the pair. The white boxes indicate where the interference experienced by a cell is similar to that of the other cell in the pair. So, at the position of the peak, the top row illustrates that the 2 neighbors of that pair of cells have similar interference, but the middle and bottom rows show that one of the cells in these pairs has different interference from the neighboring cells. This correctly indicates the PIM event.

FIG. 15*b* illustrates that the frequency based model is unable to locate the PIM event (i.e. no discernable peak is shown in the ring 1501 which should correlate with the PIM event).

Figure 15D:
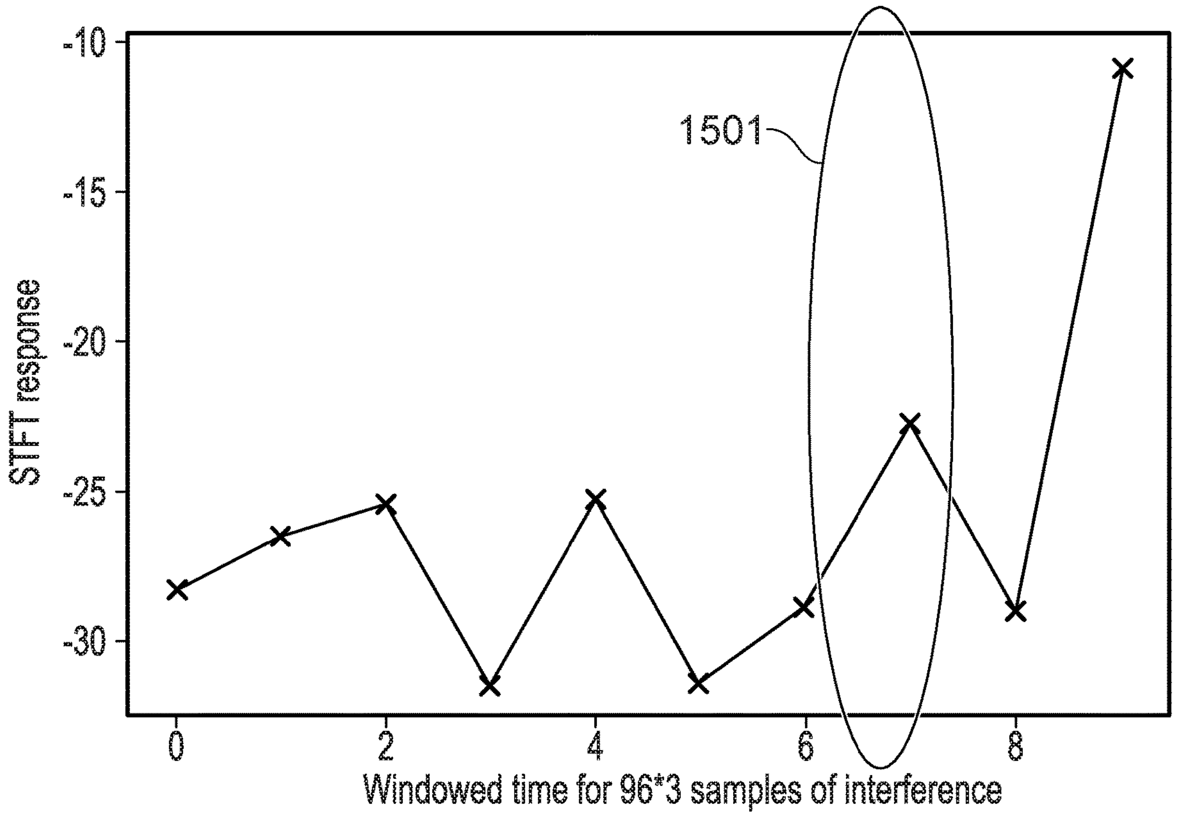

FIG. 15*d* illustrates that the sequence based model is also un unable to locate the PIM event (i.e. no discernable peak is shown in the ring 1501 which should correlate with the PIM event).

FIG. 16 illustrates the output from the three anomaly detection models 1303, 1304 and 1304 in a scenario (FIG. 16*a*) in which the plurality of cells all have intermittent missing data. In this example, the frequency-based model 1304 and the sequence based model are able to locate the zones of missing data, and able to correctly identify the PIM event 1601 with black areas or peaks respectively, as illustrated in FIGS. 16*b* and 16*d* respectively. The crude binarization of the output of the models resulting in FIGS. 16*b* and 16*d* has resulted in some errors.

Figure 16A:
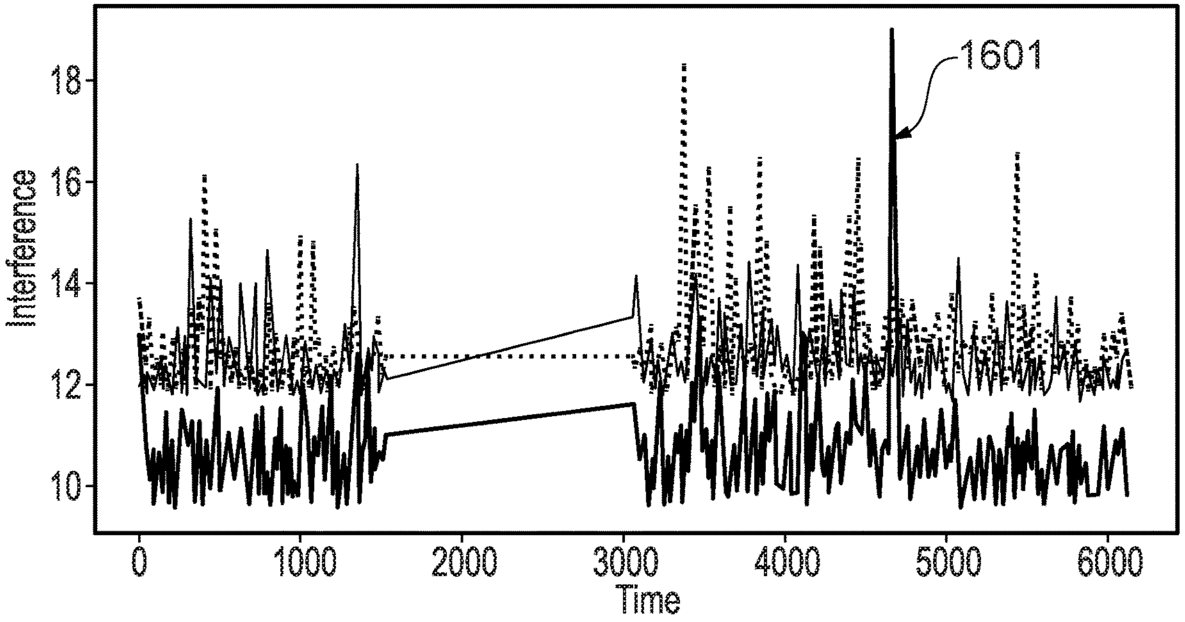
FIGS. 16*a* to 16*d* illustrate the output from the three anomaly detection models 1303, 1304 and 1304 in a scenario (FIG. 16*a*) in which the plurality of cells all have intermittent missing data.
Figure 16B:
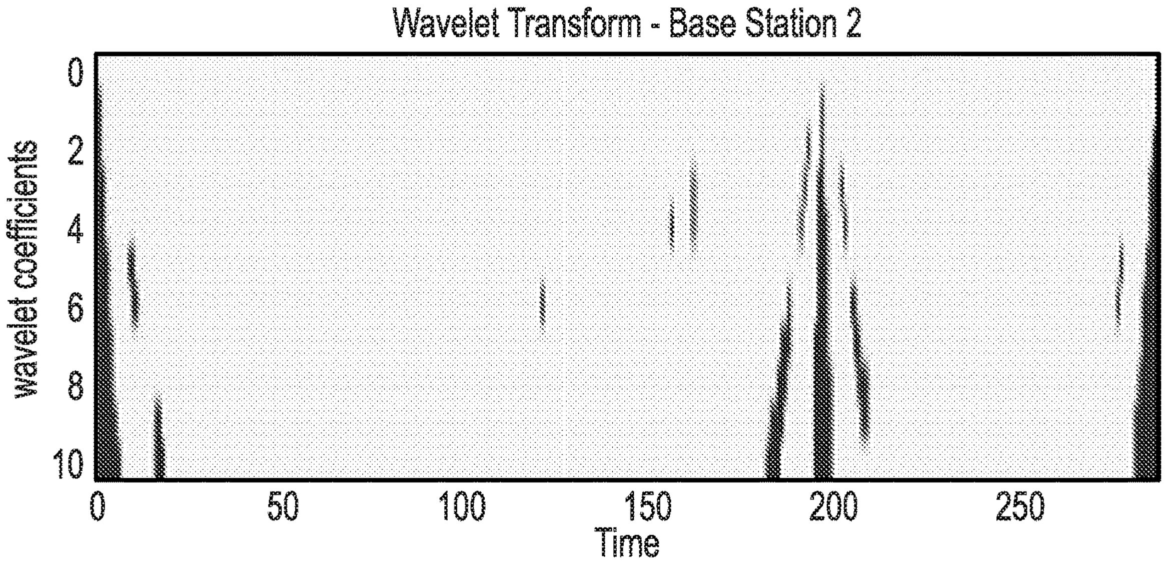
Figure 16C:
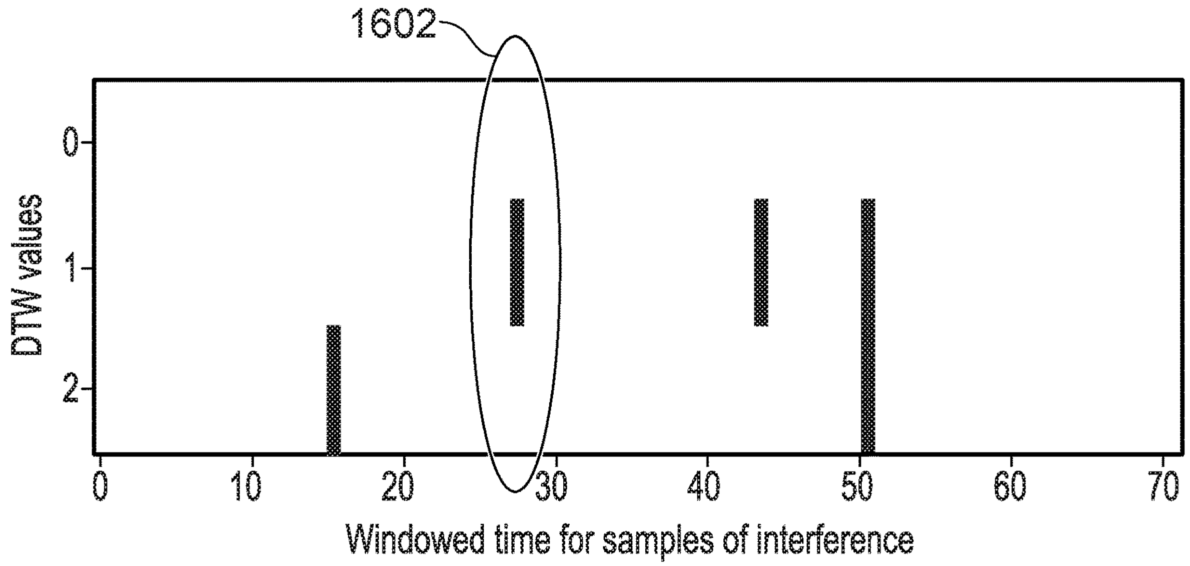
Figure 16D:
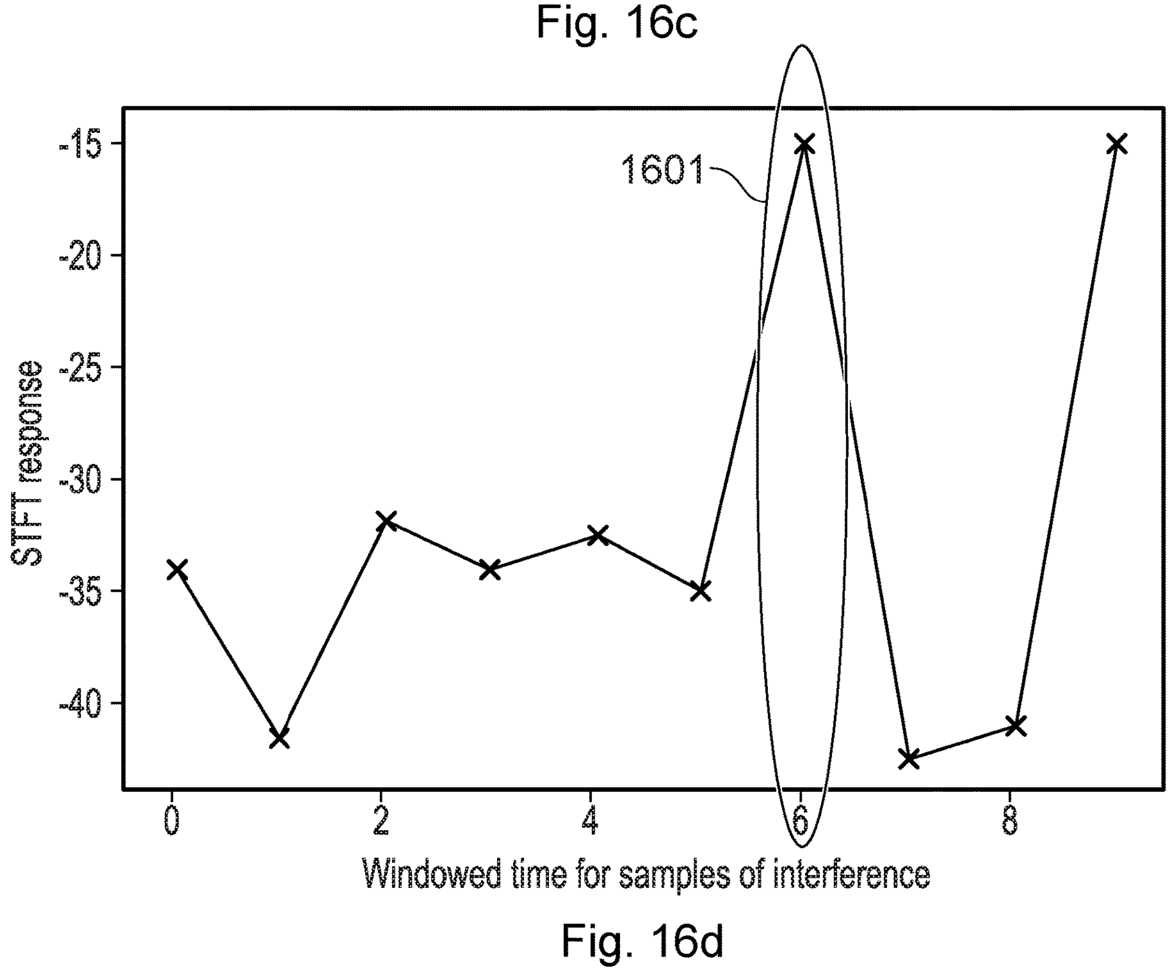

FIG. 16*c* illustrates how the time series distance based model is unable to locate the PIM event. In FIG. 16*c* only comparisons between three pairs of signals for clarity. The black boxes indicate where the interference experienced by a cell is different from that of the other cell in the pair. The white boxes indicate where the interference experienced by a cell is similar to that of the other cell in the pair. During the time period 1602 in which the missing data is present, as illustrated in FIG. 16*a*, the time series distance based model therefore incorrectly illustrates a peak as the middle row contains a black box.

Figure 17:
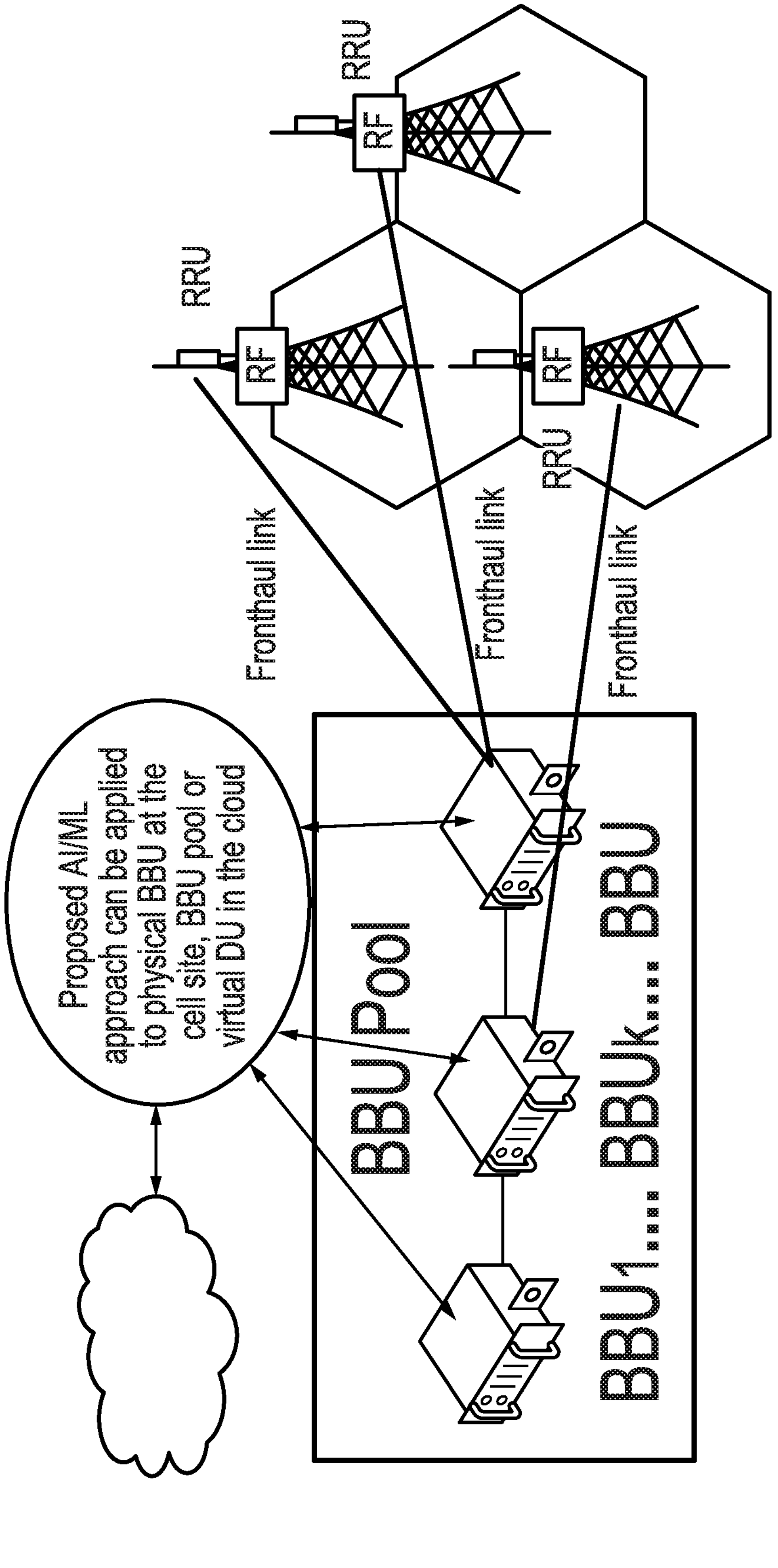
FIG. 17 illustrates a network architecture in which the apparatus of FIG. 13 may be implemented.

FIG. 17 illustrates a network architecture in which the apparatus of FIG. 13 may be implemented. As the method performed by the apparatus 1300 is light-weight it is amenable to a distributed node+cloud implementation. Various distributed processing options, that suit data source, storage, compute and coordination needs are possible. For example, the data sampling may be performed at a network node, for example a baseband unit (BBU) (the worker), with data analysis, inference, model creation, model sharing and PIM alert notification performed in the cloud (the master).

Figure 18:
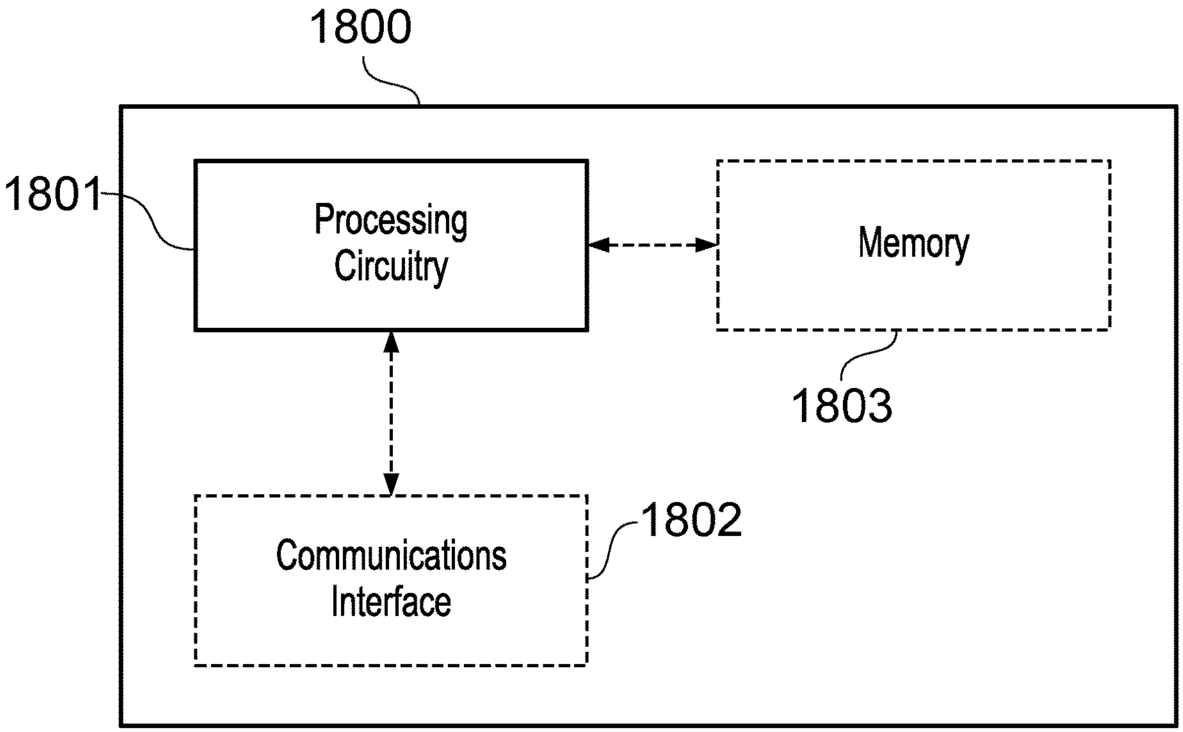
FIG. 18 illustrates an apparatus comprising processing circuitry (or logic)

FIG. 18 illustrates an apparatus 1800 comprising processing circuitry (or logic) 1801. The processing circuitry 1801 controls the operation of the apparatus 1800 and can implement the method described herein in relation to FIG. 1. The processing circuitry 1801 can comprise one or more processors, processing units, multi-core processors or modules that are configured or programmed to control the apparatus 1800 in the manner described herein. In particular implementations, the processing circuitry 1801 can comprise a plurality of software and/or hardware modules that are each configured to perform, or are for performing, individual or multiple steps of the method described herein in relation to the apparatus 1800.

The apparatus 1800 may be for detecting a PIM noise event. Briefly, the processing circuitry 1801 of the apparatus 1800 is configured to cause the apparatus 1800 to: obtain an indication of uplink noise in the first cell over a first time period; obtain an indication of uplink noise in one or more neighboring cells to the first cell over the first time period; compare the uplink noise in the first cell to the uplink noise in the one or more neighboring cells; and responsive to the comparison indicating that: the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, determine that a PIM noise event has occurred at the first cell during the second time period.

In some embodiments, the apparatus 1800 may optionally comprise a communications interface 1802. The communications interface 1802 of the apparatus 1800 can be for use in communicating with other nodes, such as other virtual nodes. For example, the communications interface 1802 of the apparatus 1800 can be configured to transmit to and/or receive from other nodes requests, resources, information, data, signals, or similar. The processing circuitry 1801 of apparatus 1800 may be configured to control the communications interface 1802 of the apparatus 1800 to transmit to and/or receive from other nodes requests, resources, information, data, signals, or similar.

Optionally, the apparatus 1800 may comprise a memory 1803. In some embodiments, the memory 1803 of the apparatus 1800 can be configured to store program code that can be executed by the processing circuitry 1801 of the apparatus 1800 to perform the method described herein in relation to the apparatus 1800. Alternatively or in addition, the memory 1803 of the apparatus 1800, can be configured to store any requests, resources, information, data, signals, or similar that are described herein. The processing circuitry 1801 of the apparatus 1800 may be configured to control the memory 1803 of the apparatus 1800 to store any requests, resources, information, data, signals, or similar that are described herein.

Figure 19:
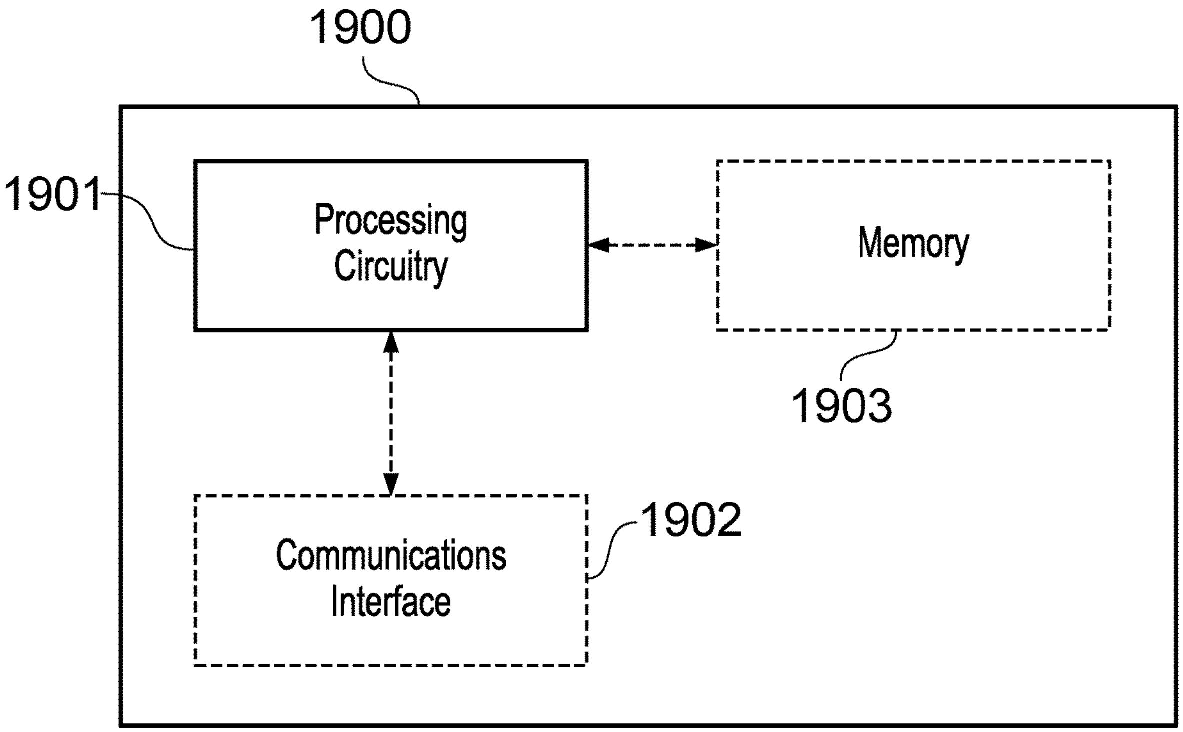
FIG. 19 illustrates an apparatus comprising processing circuitry (or logic)

FIG. 19 illustrates an apparatus 1900 comprising processing circuitry (or logic) 1901. The processing circuitry 1901 controls the operation of the apparatus 1900 and can implement the method described herein in relation to FIG. 6. The processing circuitry 1901 can comprise one or more processors, processing units, multi-core processors or modules that are configured or programmed to control the apparatus 1900 in the manner described herein. In particular implementations, the processing circuitry 1901 can comprise a plurality of software and/or hardware modules that are each configured to perform, or are for performing, individual or multiple steps of the method described herein in relation to the apparatus 1900.

The apparatus 1900 may be for determining whether an anomalous event occurring at first entity within a system has occurred locally at the first entity, wherein the system comprises a plurality of entities comprising the first entity. Briefly, the processing circuitry 1901 of the apparatus 1900 is configured to configured to cause the apparatus 1900 to: receive data from the plurality of entities indicative of whether or not an anomalous event is occurring at each of the plurality of entities over a first time period; characterize the system, based on the received data and a system characterization model, as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities; utilize one or more of a plurality of anomaly detection models to compare the data received from the first entity to the data received from other entities in the plurality of entities; and responsive to an output of any of the one or more of the plurality of anomaly detection models indicating that the anomalous event has occurred locally at the first entity: determine that a local anomalous event has occurred at the first entity; and assign a confidence level to the determination that the local anomalous event has occurred at the first entity, wherein the confidence level is based on the characterization of the system.

In some embodiments, the apparatus 1900 may optionally comprise a communications interface 1902. The communications interface 1902 of the apparatus 1900 can be for use in communicating with other nodes, such as other virtual nodes. For example, the communications interface 1902 of the apparatus 1900 can be configured to transmit to and/or receive from other nodes requests, resources, information, data, signals, or similar. The processing circuitry 1901 of apparatus 1900 may be configured to control the communications interface 1902 of the apparatus 1900 to transmit to and/or receive from other nodes requests, resources, information, data, signals, or similar.

Optionally, the apparatus 1900 may comprise a memory 1903. In some embodiments, the memory 1903 of the apparatus 1900 can be configured to store program code that can be executed by the processing circuitry 1901 of the apparatus 1900 to perform the method described herein in relation to the apparatus 1900. Alternatively or in addition, the memory 1903 of the apparatus 1900, can be configured to store any requests, resources, information, data, signals, or similar that are described herein. The processing circuitry 1901 of the apparatus 1900 may be configured to control the memory 1903 of the apparatus 1900 to store any requests, resources, information, data, signals, or similar that are described herein.

Figure 20:
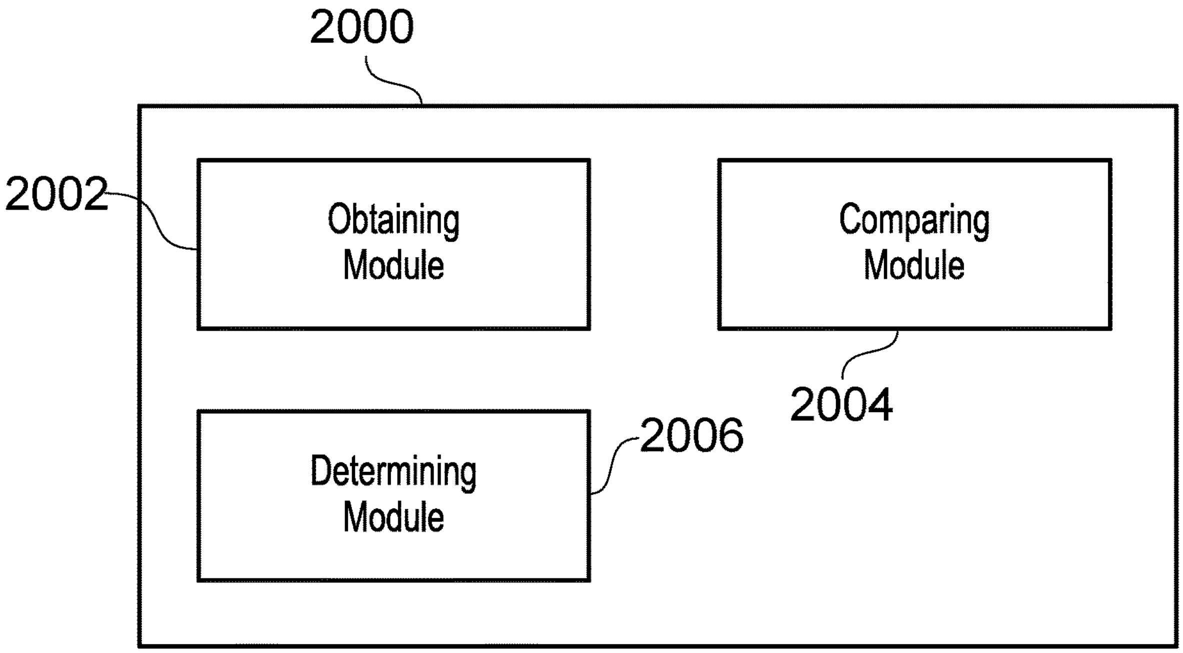
FIG. 20 is a block diagram illustrating an apparatus in accordance with an embodiment.

FIG. 20 is a block diagram illustrating an apparatus 2000 in accordance with an embodiment. The apparatus 2000 can detecting a PIM noise event. The apparatus 2000 comprises an obtaining module 2002 configured to obtain an indication of uplink noise in the first cell over a first time period, and obtain an indication of uplink noise in the first cell over a first time period. The apparatus 2000 comprises a comparing module 2004 configured to compare the uplink noise in the first cell to the uplink noise in the one or more neighboring cells. The apparatus comprises a determining module 2006 configured to responsive to the comparison indicating that: the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, determine that a PIM noise event has occurred at the first cell during the second time period. The apparatus 2000 may operate in the manner described herein in respect of an apparatus.

Figure 21:
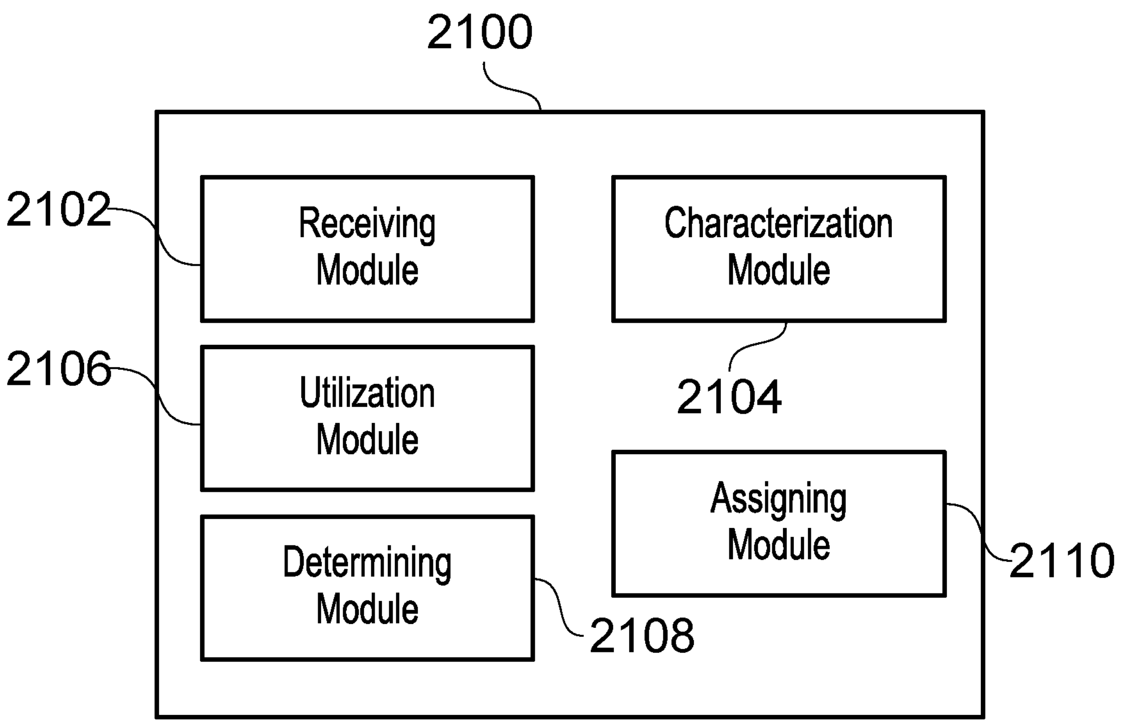
FIG. 21 is a block diagram illustrating an apparatus 2100 in accordance with an embodiment.

FIG. 21 is a block diagram illustrating an apparatus 2100 in accordance with an embodiment. The apparatus 2100 can determine whether an anomalous event occurring at first entity within a system has occurred locally at the first entity. The apparatus 2100 comprises a receiving module 2102 configured to receive data from the plurality of entities indicative of whether or not an anomalous event is occurring at each of the plurality of entities over a first time period. The apparatus 2100 comprises a characterization module 2104 configured to characterize the system, based on the received data and a system characterization model, as one of: a system in which only the first entity is experiencing an anomalous event at any one time; a system in which two or more of the plurality of entities are experiencing anomalous events occurring at any one time; and a system for which during at least one second time period within the first time period data is missing for one or more of the plurality of entities. The apparatus 2100 comprises a utilisation module 2106 configured to utilize one or more of a plurality of anomaly detection models to compare the data received from the first entity to the data received from other entities in the plurality of entities. The apparatus comprises a determining module 2108 configured to, responsive to an output of any of the one or more of the plurality of anomaly detection models indicating that the anomalous event has occurred locally at the first entity, determine that a local anomalous event has occurred at the first entity. The apparatus 2100 comprises an assigning module 2010 configured to assign a confidence level to the determination that the local anomalous event has occurred at the first entity, wherein the confidence level is based on the characterization of the system. The apparatus 2100 may operate in the manner described herein in respect of an apparatus.

There is also provided a computer program comprising instructions which, when executed by processing circuitry (such as the processing circuitry 1801 of the apparatus 1800 or the processing circuitry 1901 of the apparatus 1900 described earlier), cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein may automatically detects time stamps from KPIs where data is missing; and may automatically detects interval time stamps where the cell is experiencing high interference from PIM.

Some embodiments described herein are robust to noise and jitter in the data as well as missing data.

The embodiments described herein may alert the operator to check for potential causes of PIM from observed KPI data In some embodiments described herein, by utilizing an ensemble of anomaly detection models, the embodiments are able to identify causal intervals of missing data, and time-intervals where the cell is experiencing PIM noise. Such embodiments may adapt to recent history including traffic and other environmental changes.

Furthermore, in embodiments described herein, by automatically notifying operators of potential PIM noise events, the operator could reduce costs by avoiding problem frequencies that may lead to PIM noise events, and this can in turn lower costs.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for determining whether an anomalous event occurring at first entity within a system has occurred locally at the first entity, wherein the system comprises a plurality of entities comprising the first entity, the method comprising:

receiving data from the plurality of entities indicative of whether or not an anomalous event is occurring at each of the plurality of entities over a first time period;

characterizing the system, based on the received data and a system characterization model, as one of:

a system in which only the first entity is experiencing an anomalous event at any one time;

a system in which two or more of the plurality of entities are experiencing anomalous events occurring at any one time; and a system for which during at least one second time period within the first time period data is missing for one or more of the plurality of entities; and utilizing one or more of a plurality of anomaly detection models to compare the data received from the first entity to the data received from other entities in the plurality of entities; and responsive to an output of any of the one or more of the plurality of anomaly detection models indicating that the anomalous event has occurred locally at the first entity:

determining that a local anomalous event has occurred at the first entity; and assigning a confidence level to the determination that the local anomalous event has occurred at the first entity, wherein the confidence level is based on the characterization of the system.

2. The method as claimed in claim 1 wherein the plurality of anomaly detection models comprise two or more of: a time series distance based model, a frequency based model, and a sequence-modelling based model.

3. The method as claimed in claim 2 wherein the plurality of anomaly detection models comprise two or more of: a dynamic time warping, DTW, model, a wavelet based model, a Hidden Markov Model, HMM, model and a Long Short-Term Memory, LSTM, model.

4. The method as claimed in claim 2 wherein responsive to the system being characterized as a system in which only the first entity is experiencing an anomalous event at any one time, setting the confidence level for the output of any of the one or more anomaly detection models as high.

5. The method as claimed in claim 2 further comprising:

setting the confidence level for the output of any of the one or more anomaly detection models based on feedback relating to the performance of the one or more anomaly detection models in responsive to different characterizations of the system.

6. The method as claimed in claim 2 further comprising:

responsive to the system being characterized as a system for which during at least one second time period within the first time period data is missing for one or more of the plurality of entities, setting the confidence level for a frequency based model as higher than for others of the one or more anomaly detection models.

7. The method as claimed in claim 1 further comprising:

based on the characterization of the system, selecting the one or more of the plurality of anomaly detection models.

8. The method as claimed in claim 1 further comprising:

obtaining an indication of whether the determination that the local anomalous event occurred at the first entity was correct, and adjusting the characterization model based on the indication.

9. The method as claimed in claim 8 further comprising:

adjusting how the step of assigning a confidence level is performed responsive to the indication of whether the determination that the local anomalous event occurred at the first entity was correct.

10. The method as claimed in claim 1 further comprising:

for each of the plurality of entities, responsive to classifying the data received from the entity as dynamic data, determining that the entity is experiencing a anomalous event during periods in which the data is dynamic.

11. The method as claimed in claim 10 further wherein the step of classifying comprises utilizing a random forest based classifier.

12. The method as claimed in claim 1 wherein the plurality of entities comprise cells in a radio communications network, and wherein the data received from the plurality of entities comprises interference related data, and wherein an anomalous event comprises a rise in uplink noise.

13. The method as claimed in claim 1 wherein the plurality of entities comprises sensors in a driverless vehicle, and wherein the data received from the plurality of entities comprises sensor data, and wherein an anomalous event comprises an anomalous reading occurring at a sensor.

14. The method as claimed in claim 1 wherein the plurality of entities comprises users in a communications network, and wherein the data received from the plurality of entities comprises network logs of usage applications, and wherein an anomalous event comprises an anomaly occurring in the use of an application.

15. The method as claimed in claim 1 wherein the plurality of entities comprises provide time-series signals as the data, and wherein an anomalous event comprises any anomalous event in the time-series signals configured to trigger an alarm.

16. A method for detecting a passive intermodulation, PIM, noise event in a first cell in a network, the method comprising:

obtaining an indication of uplink noise in the first cell over a first time period;

obtaining an indication of uplink noise in one or more neighboring cells to the first cell over the first time period;

comparing the uplink noise in the first cell to the uplink noise in the one or more neighboring cells; and responsive to the comparison indicating that:

the uplink noise experienced by the first cell during a second time period within the first time period is greater than the uplink noise being experienced by the one or more neighbor cells during the second time period; and the uplink noise experienced by the first cell during a majority proportion of the first time period is considered similar to the uplink noise experienced by the one or more neighbor cells during the majority proportion of the first time period, determining that a PIM noise event has occurred at the first cell during the second time period.

17. The method as claimed in claim 16 further comprising:

determining that a PIM noise event has occurred at the first cell during the second time period further responsive to the comparison indicating that any reductions in a signal to noise ratio experienced by the first cell during the first time period do not correspond in time with any rises in uplink noise levels at the one or more neighbor cells.

18. The method as claimed in claim 16 wherein the step of comparing comprises:

utilizing one or more of a plurality of anomaly detection models to compare the data received from the first cell to the data received from the one or more neighbor cells.

19. The method as claimed in claim 18 wherein the method further comprises:

characterizing the plurality of cells comprising the first cell and the one or more neighboring cells, based on the received data and a system characterization model, as one of:

a plurality of cells in which only the first cell is experiencing a PIM at any one time;

a plurality of cells in which two or more of cells are experiencing PIMs; and a plurality of cells for which during at least one second time period within the first time period data is missing for one or more of the plurality of cells.

20. The method as claimed in claim 19 wherein further comprising:

responsive to an output of any of the one or more of the plurality of anomaly detection models indicating that a PIM has occurred at the first cell:

determining that a PIM has occurrent at the first cell; and assigning a confidence level to the determination that the local anomalous event has occurred, wherein the confidence level is based on the characterization of the system.

* * * * *